(12) United States Patent
Mihan et al.

(10) Patent No.: US 7,723,448 B2
(45) Date of Patent: May 25, 2010

(54) HYBRID CATALYST SYSTEMS SUPPORTED ON MAGNESIUM HALIDE

(75) Inventors: Shahram Mihan, Bad Soden (DE); Fabiana Fantinel, Frankfurt (DE)

(73) Assignee: Basell Polyolefine GmbH, Wesseling (DE)

( * ) Notice: Subject to any disclaimer, the term of this patent is extended or adjusted under 35 U.S.C. 154(b) by 7 days.

(21) Appl. No.: 12/083,066

(22) PCT Filed: Oct. 10, 2006

(86) PCT No.: PCT/EP2006/009749

§ 371 (c)(1), (2), (4) Date: Apr. 3, 2008

(87) PCT Pub. No.: WO2007/042252

PCT Pub. Date: Apr. 19, 2007

(65) Prior Publication Data

US 2009/0118445 A1    May 7, 2009

Related U.S. Application Data

(60) Provisional application No. 60/731,794, filed on Oct. 31, 2005.

(30) Foreign Application Priority Data

Oct. 14, 2005    (EP)    ................... 05022432

(51) Int. Cl.
*C08F 4/70*    (2006.01)
(52) U.S. Cl. ...................................... 526/115
(58) Field of Classification Search .................. 526/115
See application file for complete search history.

(56) References Cited

U.S. PATENT DOCUMENTS 3,242,150 A    3/1966    Scoggin
3,248,179 A    4/1966    Norwood
4,399,054 A    8/1983    Ferraris et al.
5,324,800 A    6/1994    Welborn, Jr. et al.
5,372,980 A    12/1994   Davis
5,539,076 A    7/1996    Nowlin et al.
5,565,534 A    10/1996   Aulbach et al.
5,585,317 A    12/1996   Sacchetti et al.
5,698,487 A    12/1997   Sacchetti et al.
5,698,642 A    12/1997   Govoni et al.
5,703,187 A    12/1997   Timmers
5,840,948 A    11/1998   Rohrmann et al.
5,955,555 A    9/1999    Bennett
6,255,418 B1   7/2001    Jolly et al.
6,437,161 B1   8/2002    Mihan et al.
6,657,026 B1   12/2003   Kimberley et al.
2005/0192418 A1   9/2005   Ewen et al.
2007/0155919 A1   7/2007   Okumura et al.
2007/0173400 A1   7/2007   Severn et al.

FOREIGN PATENT DOCUMENTS

EP    1568716    *  8/2005
WO    WO 01/36496    5/2001

OTHER PUBLICATIONS

Britovsek, et al., "Novel Olefin Polymerization Catalysts Based on Iron and Cobalt" *J. Chem. Soc., Chem. Commun.* (1998) 849.
Small, et al., "Highly Active Iron and Cobalt Catalysts for the Polymerization of Ethylene", *J. Am. Chem. Soc.*, 120 (1998) 4049.
Jutzi, et al., "Cyclopentadienyl Compounds With Nitrogen Donors in the Side-Chain" *J Organometallic Chemistry 500* (1995) 175.
Strauss, "The Search for Larger and More Weakly Coordinating Anions" *Chem. Rev. 93* (1993) 927.

* cited by examiner

*Primary Examiner*—Ling-Siu Choi
*Assistant Examiner*—Sonya Wright
(74) *Attorney, Agent, or Firm*—Jonathan L. Schuchardt

(57) ABSTRACT

The present invention relates to a catalyst system comprising at least two different transition metal coordination compounds supported on an adduct containing magnesium halide and an organoaluminum compound and it relates to a polymerisation process in the presence of said catalyst system.

9 Claims, No Drawings

HYBRID CATALYST SYSTEMS SUPPORTED ON MAGNESIUM HALIDE

CROSS-REFERENCE TO RELATED APPLICATIONS

This application is a national phase filing under 35 U.S.C. §371 of International Application PCT/EP2006/009749, filed Oct. 10, 2006, claiming priority to European Patent Application 05022432.8 filed Oct. 14, 2005 and provisional U.S. Appl. No. 60/731,794 filed Oct. 31, 2005; the disclosures of International Application PCT/EP2006/009749, Eur. Pat. Appl. 05022432.8, and U.S. Appl. No. 60/731,794, each as filed, are incorporated herein by reference.

The present invention relates to a catalyst system comprising at least two different transition metal coordination compounds supported on an adduct containing magnesium halide and an organoaluminum compound and it relates to a polymerisation process in the presence of said catalyst system.

Single site catalyst components are well known in the art and are usually used in conjunction with alumoxanes or boron compounds as cocatalysts. The catalyst systems so obtained can be used supported on an inert support in order to control the morphology of the obtained polymer and to avoid fouling in the reactor, especially in a gas-phase or slurry polymerization processes.

The drawback of the catalyst systems so obtained is that the resulting catalyst is very expensive since alumoxanes have to be used in large excess with respect to single site catalyst components. Therefore it should be desirable to reduce or eliminate the use of alumoxanes.

When boron compounds are used as cocatalyst, a large excess is not required. Boron compounds have however the drawback of being more expensive than alumoxanes and dangerous to handle.

The use of catalyst compositions comprising two or more different olefin polymerization catalysts of the Ziegler type or the metallocene type is known. For example, it is possible to use a combination of two catalysts of which one produces a polyethylene having a mean molar mass which is different from that produced by the other for preparing reactor blends having broad molecular weight distributions (WO 95/11264). The copolymers of ethylene with higher α-olefins such as propene, 1-butene, 1-pentene, 1-hexene or 1-octene, known as LLDPE (linear low density polyethylene) which are formed using classical Ziegler-Natta catalysts based on titanium are different from an LLDPE which is prepared using a metallocene. The number of side chains formed by incorporation of the comonomer and their distribution, known as the SCBD (short chain branching distribution) is very different when using the various catalyst systems. The number and distribution of the side chains has a critical influence on the crystallization behaviour of the ethylene copolymers. While the flow properties and thus the processability of these ethylene copolymers depends mainly on their molar mass and molar mass distribution, the mechanical properties are therefore particularly dependent on the short chain branching distribution. However, the short chain branching distribution also plays a role in particular processing methods, e.g. in film extrusion in which the crystallization behaviour of the ethylene copolymers during cooling of the film extrudate is an important factor in determining how quickly and in what quality a film can be extruded. The correct combination of catalysts for a balanced combination of good mechanical properties and good processability is difficult to find in view of the large number of possible combinations. The single site components in the above mentioned catalyst systems are usually activated by aluminoxanes.

WO 99/46302 describes a catalyst composition based on (a) an iron-pyridinebisimine component and (b) a further catalyst such as a zirconocene or Ziegler catalyst and their use for the polymerization of ethylene and olefins. The transition metal coordination compounds in theses types of catalysts are usually activated by aluminoxanes.

The drawback of these mixed catalyst systems is that during storage of these catalyst systems the structure and nature of aluminoxane is changing resulting in changing activities of the initial catalyst systems. The activities of the different supported single site systems are differently changed. Therefore the reproducibility of the preparation of a desired bimodal polyolefin product using an aged catalyst system is limited.

EP 1568716 describes catalyst systems comprising a support based on magnesium halide and a special transition metal coordination compound. These special catalyst systems are active without the addition of alumoxanes. Nothing is said about catalyst systems comprising two different transition metal coordination compounds.

It was an object of the present invention to provide a catalyst system useable in commercial production plants comprising at least two different transition metal coordination compounds wherein said catalyst system is more economical and is more stable during storage than the known systems.

It has surprisingly been found that this object can be achieved by a supported catalyst system comprising the product obtainable by contacting:

a) an adduct of formula (I)

(I)

wherein

Mg is magnesium;

T is chlorine, bromine, or iodine, preferably chlorine;

Al is aluminium $R^u$ is a linear or branched $C_1$-$C_{10}$ alkyl radical, preferably a linear $C_1$-$C_{10}$ alkyl radical, more preferably methyl or ethyl;

y ranges from 6.00 to 0.05; preferably Y ranges from 2 to 0.1, more preferably from 1 to 0.1;

j ranges from 3 to 0.1, preferably from 3 to 0.5; more preferably from 3 to 1 being also a non integer number; and $R^q$ are substituents which are the same or different and which are hydrocarbon radicals containing from 1 to 20 carbon atoms optionally containing silicon or germanium atoms, preferably $R^q$ is a linear or branched, cyclic or acyclic, $C_1$-$C_{20}$-alkyl, $C_2$-$C_{20}$-alkenyl, $C_2$-$C_{20}$-alkynyl, $C_6$-$C_{20}$-aryl, $C_7$-$C_{20}$-alkylaryl or $C_7$-$C_{20}$-arylalkyl radicals optionally containing silicon or germanium atoms; more preferably $R^q$ is a linear or branched $C_1$-$C_{20}$-alkyl radical; even more preferably $R^q$ is an ethyl, a n-propyl, an iso-propyl, a n-butyl, an iso-butyl, a tert-butyl, a hexyl or an octyl radical;

b) with at least two different transition metal coordination compounds wherein one of the transition metal coordination compounds is a compound in which the transition metal is selected from Groups 6, 8, 9 and 10 of the Periodic Table of the Elements (B), preferably selected from the group of elements consisting of Cr, Fe, Co, Ni and Pd, particularly preferably Fe and Co, in particular Fe.

The adduct of formula (I)

(I)

has a surface area (BET) higher than 30 m²/g; more preferably higher than 38 m²/g; even more preferably higher than 200 m²/g; but it can reach values higher than 300 m²/g. It can be obtained with methods commonly known in the art. For example the adduct $MgT_2 \cdot w\ R''OH$, wherein w ranges from 0.1 to 6 is contacted with an aluminum compound of formula $H_eAlR^{q1}_{3-e}$ or $H_eAl_2R^{q1}_{6-e}$, in an inert solvent; where the $R^{q1}$ substituents, same or different, are hydrogen atoms, halogen atoms, or hydrocarbon radicals containing from 1 to 20 carbon atoms optionally containing silicon or germanium atoms; with the proviso that at least one $R_{q1}$ is different from halogen, and e ranges from 0 to 1, being also a non-integer number; preferably such hydrocarbon radicals are linear or branched, cyclic or acyclic, $C_1$-$C_{20}$-alkyl, $C_2$-$C_{20}$-alkenyl, $C_2$-$C_{20}$-alkynyl, $C_6$-$C_{20}$-aryl, $C_7$-$C_{20}$-alkylaryl or $C_7$-$C_{20}$-arylalkyl radicals optionally containing silicon or germanium atoms; preferably $R^{q1}$ is a linear or branched $C_1$-$C_{20}$-alkyl radical; more preferably an ethyl, a n-propyl, an iso-propyl, a n-butyl, an iso-butyl, a tert-butyl, a hexyl or an octyl radical. Examples of this reaction can be found in U.S. Pat. No. 4,399,054 and U.S. Pat. No. 5,698,487.

Preferably the adduct of formula $MgT_2 \cdot w\ R''OH$ is partially dealcoholated as described in U.S. Pat. No. 5,698,487. Therefore a further object of the present invention is a supported catalyst system obtainable by the process comprising the following steps:

a) contacting
(i) a partially dealcoholated adduct of formula $MgT_2 \cdot w\ R''OH$ wherein T is chlorine, bromine, or iodine, preferably chlorine; $R''$ is a linear or branched $C_1$-$C_{10}$ alkyl radical, preferably $R''$ is a linear $C_1$-$C_{10}$ alkyl radical; more preferably $R''$ is a methyl or an ethyl radical; w ranges from 6 to 0.1, preferably from 3 to 0.5; more preferably from 2.9 to 0.5 being also a non integer number; with
(ii) an organo-aluminium compound of formula $H_eAlR^{q1}_{3-e}$ or $H_eAl_2R^{q1}_{6-e}$, where the $R^{q1}$ substituents, same or different, are hydrogen atoms, halogen atoms, or hydrocarbon radicals containing from 1 to 20 carbon atoms optionally containing silicon or germanium atoms; with the proviso that at least one $R^{q1}$ is different from halogen, and e ranges from 0 to 1, being also a non-integer number; preferably such hydrocarbon radicals are linear or branched, cyclic or acyclic, $C_1$-$C_{20}$-alkyl, $C_2$-$C_{20}$alkenyl, $C_2$-$C_{20}$-alkynyl, $C_6$-$C_{20}$-aryl, $C_7$-$C_{20}$-alkylaryl or $C_7$-$C_{20}$-arylalkyl radicals optionally containing silicon or germanium atoms; preferably $R^{q1}$ is a linear or branched $C_1$-$C_{20}$-alkyl radical; more preferably $R^{q1}$ is an ethyl, a n-propyl, an iso-propyl, a n-butyl, an isobutyl, a tert-butyl, a hexyl or an octyl radical;

to obtain an adduct of formula (I) $MgT_2 \cdot y\ AlR^q_j(OR'')_{3-j}$ described above; and b) contacting the product obtained from step a) with at least two different transition metal coordination compounds wherein one of the transition metal coordination compounds is a compound in which the transition metal is selected from Groups 6, 8, 9 and 10 of the Periodic Table of the Elements (B), preferably selected from the group of elements consisting of Cr, Fe, Co, Ni and Pd, particularly preferably Fe and Co, in particular Fe as described above.

The partially dealcoholated adduct of formula $MgT_2 \cdot w\ R''OH$ used in step a) can be obtained by partial dealcoholation of adducts of $MgT_2$ with alcohols, said adducts contains from 1 to 6 mol of alcohol. It is possible that two adducts having the same content of alcohol, i.e. having the same empirical formula, be different in porosity and surface area for the reason that one adduct is partially dealcoholated.

The dealcoholation can be carried out according to known methodologies such as those described in U.S. Pat. No. 5,698, 487. Depending on the extent of the dealcoholation treatment, partially dealcoholated adducts can be obtained having an alcohol content generally ranging from 0.1 to 3 moles of alcohol per mole of $MgT_2$, preferably from 2.9 to 0.5; more preferably from 2.9 to 1.

Said partially dealcoholated magnesium adduct is then contacted with an organo-aluminium compound of formula $H_eAlR^{q1}_{3-e}$ or $H_eAl_2R^{q1}_{6-e}$ in an inert solvent with methods common known in the art, such as the method described in EP-A-553 806.

In step b) of the process of the present invention at least two different transition metal coordination compounds, preferably 2 or 3, more preferably two different transition metal coordination compounds can be supported on the carrier obtained in step a) according to known methods by bringing the product of step a) into contact, for example, with a solution of the said transition metal coordination compounds, operating at temperatures between −78° C. and 150° C., preferably between room temperature and 120° C. The said transition metal coordination compounds that are not fixed on the support are removed by filtration or similar methods.

The amount of said transition metal coordination compounds supported on the adduct of formula (I) is generally between 1000 μmol/g of support and 1 μmol/g of support; preferably said amount ranges from 500 μmol/g of support to 2 μmol/g of support; more preferably from 200 μmol/g of support to 2 μmol/g of support.

The molar ratio of said transition metal coordination compounds in the inventive catalyst system depends on the individual activity of each transition metal coordination compound and on the intended polymer composition. The molar proportion of each transition metal coordination compound supported on the adduct of formula (I) is usually at least 1%, preferably at least 5%, more preferably at least 10%, most preferably at least 15% of the total molar amount of used transition metal coordination compounds.

The supported catalyst system described in the present invention comprises at least two different transition metal coordination compounds wherein one of the transition metal coordination compounds is a compound in which the transition metal is selected from Groups 6, 8, 9 and 10 of the Periodic Table of the Elements (B), preferably selected from the group of elements consisting of Cr, Fe, Co, Ni and Pd, particularly preferably Fe and Co, in particular Fe. This first transition metal compound (B) comprises preferably ligands selected from the group consisting of cyclopentadienyl derivatives, phenoxyimine derivatives and uncharged or singly or multiply negatively charged monodentate, bidentate or tridentate nitrogen ligands having one, two or three coordinating nitrogen atoms, preferably cyclopentadienyl derivatives and uncharged, tridentate nitrogen ligands having three coordinating nitrogen atoms.

As additional transition metal coordination compounds (A), it is in principle possible to use all compounds of the transition metals of groups 3 to 12 of the Periodic Table or the lanthanides which comprise organic or inorganic groups and usually form active catalysts for olefin polymerization after reaction with a cocatalyst, specially with the adduct of formula (I). The transition metal coordination compounds are usually compounds in which at least one monodentate or polydentate ligand is bound via sigma or pi bonds to the central transition metal atom. Possible ligands include both ligands comprising cyclopentadienyl radicals and ligands which are free of cyclopentadienyl radicals, preferably ligands selected from the group consisting of cyclopentadienyl derivatives, phenoxyimine derivatives and uncharged or singly or multiply negatively charged monodentate, bidentate or tridentate nitrogen ligands having one, two or three coordinating nitrogen atoms, preferably cyclopentadienyl derivatives and uncharged, tridentate nitrogen ligands having three coordinating nitrogen atoms. Chem. Rev. 2000, Vol. 100, No. 4, describes many such compounds which are suitable for olefin polymerization. Furthermore, multinuclear cyclopentadienyl complexes are also suitable for olefin polymerization.

Illustrative examples which do not, however, restrict the scope of the invention of the at least two different transition metal compounds (A) and (B) which can be used in the preparation of the inventive catalyst system are:

a) (A) and (B) are two different iron coordination compounds like:

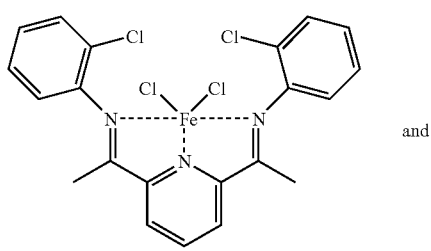
(A)

and

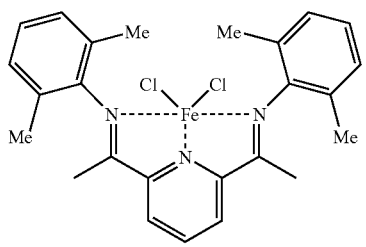
(B)

b) (A) and (B) are two different chromium coordination compounds like:

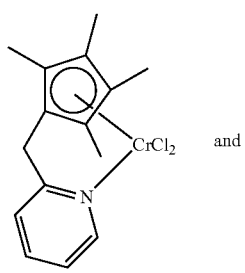
(A)

and

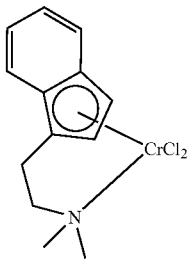
(B)

c) (A) is a Ti, Zr or Hf coordination compound like TiCl$_4$, Ti(OiPr)$_4$, ZrCl$_4$ or (n-Bu-Cp)$_2$HfCl$_2$ and (B) is an iron coordination compound like

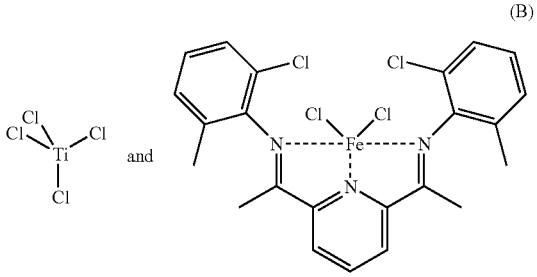
(B)

d) (A) is a chromium coordination compound and (B) is a iron coordination compound like

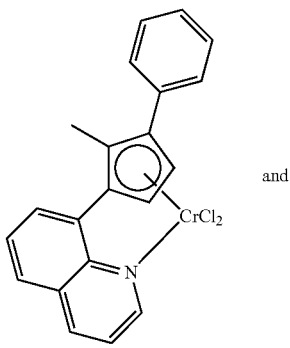
(A)

and

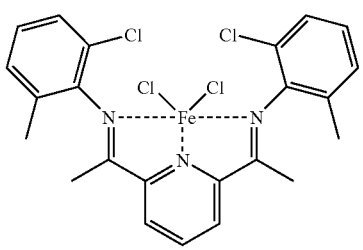
(B)

Preference is given to supported catalyst systems wherein one of the transition metal coordination compounds is an iron or cobalt, preferably an iron coordination compound (B) comprising a neutral tridentate ligand comprising three coordinating nitrogen atoms, preferably a 2,6-bisimino pyridin ligand.

Preferably the neutral tridentate ligand comprising three coordinating nitrogen atoms of the iron or cobalt coordination compound (B) bears at least two ortho, ortho-disubstituted aryl radicals.

Preference is given to transition metal coordination compounds (B) of formula (II)

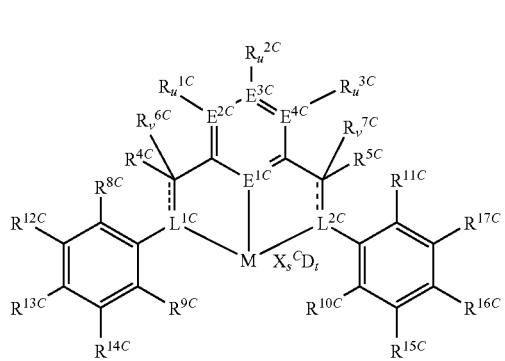

(II)

where the variables have the following meanings:

M is Fe or Co, in particular Fe $E^{1C}$ is nitrogen or phosphorus, in particular nitrogen, $E^{2C}$-$E^{4C}$ are each, independently of one another, carbon, nitrogen or phosphorus, in particular carbon, $R^{1C}$-$R^{3C}$ are each, independently of one another, hydrogen $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}$-$R^{3C}$ are joined to form a five-, six- or seven-membered heterocycle containing at least one atom from the group consisting of N, P, O and S, $R^{4C}$-$R^{7C}$ care each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, $NR^{18C}_2$, $SiR^{19C}_3$, where the organic radicals $R^{4C}$-$R^{7C}$ may also be substituted by halogens and/or two geminal or vicinal radicals $R^{4C}$-$R^{7C}$ may also be joined to form a five-, six- or seven-membered ring, and/or two geminal or vicinal radicals $R^{4C}$-$R^{7C}$ are joined to form a five-, six- or seven-membered heterocycle containing at least one atom from the group consisting of N, P, O and S, and when v is 0, $R^{6C}$ is a bond to $L^{1C}$ and/or $R^{7C}$ is a bond to $L^{2C}$ so that $L^{1C}$ forms a double bond to the carbon atom bearing $R^{4C}$ and/or $L^{2C}$ forms a double bond to the carbon atom bearing $R^{5C}$.

u is 0 when $E^{2C}$-$E^{4C}$ is nitrogen or phosphorus and is 1 when $E^{2C}$-$E^{4C}$ is carbon, $L^{1C}$-$L^{2C}$ are each, independently of one another, nitrogen or phosphorus, in particular nitrogen, $R^{8C}$-$R^{11C}$ are each, independently of one another, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{8C}$-$R^{11C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S, $R^{12C}$-$R^{17C}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S, the indices v are each, independently of one another, 0 or 1, the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, arylalkyl having 1-10 carbon atoms in the alkyl part and 6-20 carbon atoms in the aryl part, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or a bulky noncoordinating anion and the radicals $X^C$ may be joined to one another, the radicals $R^{18C}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl part and 6-20 carbon atoms in the aryl part, $SiR^{19C}_3$, where the organic radicals $R^{18C}$ may also be substituted by halogens or nitrogen- and oxygen-containing groups and two radicals $R^{18C}$ may also be joined to form a five- or six-membered ring, the radicals $R^{19C}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{19C}$ may also be joined to form a five- or six-membered ring, s is 1, 2, 3 or 4, in particular 2 or 3, D is an uncharged donor and t is from 0 to 4, in particular 0, 1 or 2.

The three atoms $E^{2C}$ to $E^{4C}$ in a molecule of formula (II) can be identical or different. If $E^{1C}$ is phosphorus, then $E^{2C}$ to $E^{4C}$ are preferably each carbon. If $E^{1C}$ is nitrogen, then $E^{2C}$ to $E_{4C}$ are each preferably nitrogen or carbon, in particular carbon.

The substituents $R^{1C}$-$R^{3C}$ and $R^{8C}$-$R^{17C}$ can be varied within a wide range. Possible carboorganic substituents $R^{1C}$-$R^{3C}$ and $R^{8C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-phenylethyl, where two radicals $R^{1C}$ to $R^{3C}$ and/or two vicinal radicals $R^{8C}$-$R^{17C}$ may also be joined to form a 5-, 6- or 7-membered ring and/or two of the vicinal radicals $R^{1C}$-$R^{3C}$ and/or two of the vicinal radicals $R^{8C}$-$R^{17C}$ may be joined to form a five-, six- or seven-membered heterocycle containing at least one atom from the group consisting of N, P, O and S and/or the organic radicals $R^{1C}$-$R^{3C}$ and/or $R^{8C}$-$R^{17C}$ may also be substituted by halogens such as fluorine, chlorine or bromine. Furthermore, $R^{1C}$-$R^{3C}$ and $R^{8C}$-$R^{17C}$ can also be amino $NR^{18C}{}_2$ or $N(SiR^{19C}{}_3)_2$, alkoxy or aryloxy $OR^{18C}$, for example dimethylamino, N-pyrrolidinyl, picolinyl, methoxy, ethoxy or isopropoxy or halogen such as fluorine, chlorine or bromine. Possible radicals $R^{19C}$ in organosilicon substituents $SiR^{19C}{}_3$ are the same carboorganic radicals as have been described above for $R^{1C}$-$R^{3C}$, where two $R^{19C}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}{}_3$ radicals may also be bound to $E^{2C}$-$E^{4C}$ via an oxygen or nitrogen, for example trimethylsilyloxy, triethylsilyloxy, butyldimethylsilyloxy, tributylsilyloxy or tri-tert-butylsilyloxy.

Preferred radicals $R^{1C}$-$R^{3C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly preferred organosilicon substituents are trialkylsilyl groups having from 1 to 10 carbon atoms in the alkyl radical, in particular trimethylsilyl groups.

Preferred radicals $R^{12C}$-$R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, $R^{13C}$ and $R^{16C}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{12C}$, $R^{14C}$, $R^{15C}$ and $R^{17C}$ are each hydrogen.

Preferred radicals $R^{8C}$-$R^{11C}$ are methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular, $R^{8C}$ and $R^{10C}$ are each a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl, or a halogen such as fluorine, chlorine or bromine and $R^{9C}$ and $R^{11C}$ are each a halogen such as fluorine, chlorine or bromine. Particular preference is given to $R^{6C}$ and $R^{10C}$ each being a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl and $R^{9C}$ and $R^{11C}$ are each a halogen such as fluorine, chlorine or bromine.

In particular, $R^{12C}$, $R^{14C}$, $R^{15C}$ and $R^{17C}$ are identical, $R^{13C}$ and $R^{16C}$ are identical, $R^{9C}$ and $R^{11C}$ are identical and $R^{8C}$ and $R^{10C}$ are identical. This is also preferred in the preferred embodiments described above.

The substituents $R^{4C}$-$R^{7C}$, too, can be varied within a wide range. Possible carboorganic substituents $R^{4C}$-$R^{7C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl, where the arylalkyl may be substituted by further alkyl groups, e.g. benzyl, o-, m-, p-methylbenzyl, 1- or 2-phenylethyl, where two radicals $R^{4C}$ to $R^{7C}$ may also be joined to form a 5-, 6- or 7-membered ring and/or two geminal radicals $R^{4C}$-$R^{7C}$ may be joined to form a five-, six- or seven-membered heterocycle containing at least one atom from the group consisting of N, P, O and S and/or the organic radicals $R^{4C}$-$R^{7C}$ may also be substituted by halogens such as fluorine, chlorine or bromine. Furthermore, $R^{4C}$-$R^{7C}$ may be amino $NR^{18C}{}_2$ or $N(SiR^{19C}{}_3)_2$, for example dimethylamino, N-pyrrolidinyl or picolinyl. Possible radicals $R^{19C}$ in organosilicone substituents $SiR^{19C}{}_3$ are the same carboorganic radicals as have been described above for $R^{1C}$-$R^{3C}$, where two $R^{19C}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}{}_3$ radicals can also be bound via nitrogen to the carbon bearing them. When v is 0, $R^{6C}$ is a bond to $L^{1C}$ and/or $R^{7C}$ is a bond to $L^{2C}$, so that $L^{1C}$ forms a double bond to the carbon atom bearing $R^{4C}$ and/or $L^{2C}$ forms a double bond to the carbon atom bearing $R^{5C}$.

Preferred radicals $R^{4C}$-$R^{7C}$ are hydrogen, methyl, ethyl, n-propyl, isopropyl, n-butyl, isobutyl, tert-butyl, n-pentyl, n-hexyl, n-heptyl, n-octyl, benzyl, phenyl, ortho-dialkyl- or dichloro-substituted phenyls, trialkyl- or trichloro-substituted phenyls, naphthyl, biphenyl and anthranyl. Preference is also given to amide substituents $NR^{18C}{}_2$, in particular secondary amides such as dimethylamide, N-ethylmethylamide, diethylamide, N-methylpropylamide, N-methylisopropylamide, N-ethylisopropylamide, dipropylamide, diisopropylamide, N-methylbutylamide, N-ethylbutylamide, N-methyl-tert-butylamide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octylamide, dioctylamide, bis(2-ethylhexyl)amide, didecylamide, N-methyloctadecylamide, N-methylcyclohexylamide, N-ethylcyclohexylamide, N-isopropylcyclohexylamide, N-tert-butyl-cyclohexylamide, dicyclohexylamide, pyrrolidine, piperidine, hexamethylenimine, decahydro-quinoline, diphenylamine, N-methylanilide or N-ethylanilide.

$L^{1C}$ and $L^{2C}$ are each, independently of one another, nitrogen or phosphorus, in particular nitrogen, and when v is 0 can form a double bond with the carbon atom bearing $R^{4C}$ or $R^{5C}$. In particular, when v is 0, $L^{1C}$ and/or $L^{2C}$ together with the carbon atom bearing $R^{4C}$ or $R^{5C}$ form an imino group —$CR^{4C}$=N— or —$CR^{5C}$=N—. When v is 1, $L^{1C}$ and/or $L^{2C}$ together with the carbon atom bearing $R^{4C}$ or $R^{5C}$ forms, in particular, an amido group —$CR^{4C}R^{6C}$—$N^-$— or —$CR^{5C}R^{7C}$—$N^-$—.

The ligands $X^C$ result, for example, from the choice of the appropriate starting metal compounds used for the synthesis of the iron complexes, but can also be varied afterward. Possible ligands $X^C$ are, in particular, the halogens such as fluorine, chlorine, bromine or iodine, in particular chlorine. Alkyl radicals such as methyl, ethyl, propyl, butyl, vinyl, allyl, phenyl or benzyl are also usable ligands $X^C$. As further ligands $X^C$, mention may be made, purely by way of example and in no way exhaustively, of trifluoroacetate, $BF_4^-$; $PF_6^-$ and weakly coordinating or noncoordinating anions (cf., for example, S. Strauss in Chem. Rev. 1993, 93, 927-942), e.g. $B(C_6F_5)_4^-$. Amides, alkoxides, sulfonates, carboxylates and β-diketonates are also particularly useful ligands $X^C$. Some of these substituted ligands X are particularly preferably used since they are obtainable from cheap and readily available starting materials. Thus, a particularly preferred embodiment is that in which $X^C$ is dimethylamide, methoxide, ethoxide, isopropoxide, phenoxide, naphthoxide, triflate, p-toluenesulfonate, acetate or acetylacetonate.

Variation of the radicals $R^{18C}$ enables, for example, physical properties such as solubility to be finely adjusted. Possible carboorganic substituents $R^{18C}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N- or O-containing radicals, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-phenylethyl, where two radicals $R^{18C}$ may also be joined to form a 5- or 6-membered ring and the organic radicals $R^{18C}$ may also be substituted by halogens such as fluorine, chlorine or bromine. Possible radicals $R^{19C}$ in organosilicon substituents $SiR^{19C}_3$ are the same radicals which have been described above for $R^{18C}$, where two radicals $R^{19C}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl, and also vinyl allyl, benzyl and phenyl as radicals $R^{18C}$.

The number s of the ligands $X^C$ depends on the oxidation state of the metal M that Fe or Co, in particular Fe. The number s can thus not be given in general terms. The oxidation state of the iron in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to using iron complexes in the oxidation state +3 or +2.

D is an uncharged donor, in particular an uncharged Lewis base or Lewis acid, for example amines, alcohols, ethers, ketones, aldehydes, esters, sulfides or phosphines which may be bound to the iron center or else still be present as residual solvent from the preparation of the iron complexes.

The number t of the ligands D can be from 0 to 4 and is often dependent on the solvent in which the iron or cobalt complex is prepared and the time for which the resulting complexes are dried and can therefore also be a nonintegral number such as 0.5 or 1.5. In particular, t is 0, 1 to 2.

In a preferred embodiment are the transition metal coordination compounds (B) of formula (IIa)

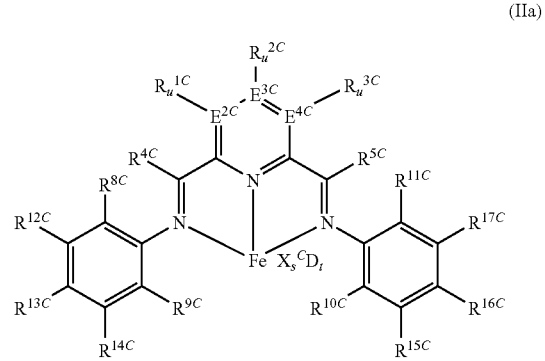

(IIa)

where $E^{2C}$-$E^{4C}$ are each, independently of one another, carbon, nitrogen or phosphorus, in particular carbon, $R^{1C}$-$R^{3C}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}$-$R^{3C}$ are bound to form a five-, six- or seven-membered heterocycle containing at least one atom from the group consisting of N, P, O and S, $R^{4C}$-$R^{5C}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, $NR^{18C}_2$, $SiR^{19C}_3$, where the organic radicals $R^{4C}$-$R^{5C}$ may also be substituted by halogens, u is 0 when $E^{2C}$-$E^{4C}$ is nitrogen or phosphorus and is 1 when $E^{2C}$-$E^{4C}$ is carbon, $L^{1C}$-$L^{2C}$ are each, independently of one another, nitrogen or phosphorus, in particular nitrogen, $R^{6C}$-$R^{11C}$ are each, independently of one another, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, halogen, $NR^{18C}_2$, $OR^{19C}$, $SiR^{19C}_3$, where the organic radicals $R^{8C}$-$R^{11C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S, $R^{12C}$-$R^{17C}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O or S, the indices v are each, independently of one another, 0 or 1, the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, arylalkyl having 1-10 carbon atoms in the alkyl part and 6-20 carbon atoms in the aryl part, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or a bulky noncoordinating anion and the radicals $X^C$ may be joined to one another, the radicals $R^{18C}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl part and 6-20 carbon atoms in the aryl part, $SiR^{19C}_3$, where the organic radicals $R^{18C}$ may also be substituted by halogens and nitrogen- and oxygen-containing groups and two radicals $R^{18C}$ may also be joined to form a five- or six-membered ring, the radicals $R^{19C}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{19C}$ may also be joined to form a five or six-membered ring, s is 1, 2, 3 or 4, in particular 2 or 3, D is an uncharged donor and t is from 0 to 4, in particular 0, 1 or 2.

The embodiments and preferred embodiments described above likewise apply to $E^{2C}$-$E^{4C}$, $R^{1C}$-$R^{3C}$, $X^C$, $R^{18C}$ and $R^{19C}$.

The substituents $R^{4C}$-$R^{5C}$ can be varied within a wide range. Possible carboorganic substituents $R^{4C}$-$R^{5C}$ are, for example, the following: hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopeantyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-phenylethyl, where the organic radicals $R^{4C}$-$R^{5C}$ may also be substituted by halogens such as fluorine, chlorine or bromine. Furthermore, $R^{4C}$-$R^{5C}$ can be amino $NR^{18C}_2$ or $N(SiR^{19C}_3)_2$, for example dimethylamino, N-pyrrolidinyl or picolinyl. Possible radicals $R_{19C}$ in organosilicon substituents $SiR^{19C}_3$ are the same carboorganic radicals as described above for $R^{1C}$-$R^{3C}$, where two radicals $R^{19C}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{19C}_3$ radicals can also be bound via nitrogen to the carbon bearing them.

Preferred radicals $R^{4C}$-$R^{5C}$ are hydrogen, methyl, ethyl, n-propyl, isopropyl, n-butyl, isobutyl, tert-butyl, n-pentyl, n-hexyl, n-heptyl, n-octyl or benzyl, in particular methyl.

The substituents $R^{8C}$-$R^{17C}$ can be varied within a wide range. Possible carboorganic substituents $R^{8C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3, 4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-phenylethyl, where two radicals $R^{8C}$ to $R^{17C}$ may also be joined to form a 5-, 6- or 7-membered ring and/or two of the vicinal radicals $R^{8C}$-$R^{17C}$ may be joined to form a five-, six- or seven-membered heterocycle containing at least one atom from the group consisting of N, P, O and S and/or the organic radicals $R^{8C}$-$R^{17C}$ may also be substituted by halogens such as fluorine, chlorine or bromine. Furthermore, $R^{8C}$-$R^{17C}$ can be halogen such as fluorine, chlorine, bromine, amino $NR^{18C}_2$ or $N(SiR^{19C}_3)_2$, alkoxy or aryloxy $OR^{18C}$, for example dimethylamino, N-pyrrolidinyl, picolinyl, methoxy, ethoxy or isopropoxy. Possible radicals $R^{19C}$ in organosilicon substituents $SiR^{19C}_3$ are the same carboorganic radicals which have been mentioned above for $R^{1C}$-$R^{3C}$, where two radicals $R^{19C}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{19C}_3$ radicals can also be bound via an oxygen or nitrogen, for example trimethylsilyloxy, triethylsilyloxy, butyldimethylsilyloxy, tributylsilyloxy or tritert.butylsilyloxy.

Preferred radicals $R^{12C}$-$R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, $R^{13C}$ and $R^{16C}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{12C}$, $R^{14C}$, $R^{15C}$ and $R^{17C}$ are each hydrogen.

Preferred radicals $R^{8C}$-$R^{11C}$ are methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular $R^{6C}$ and $R^{10C}$ are each a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl, or a halogen such as fluorine, chlorine or bromine and $R^{9C}$ and $R^{11C}$ are each a halogen such as fluorine, chlorine or bromine. Particular preference is given to $R^{8C}$ and $R^{10C}$ each being a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl and $R^{9C}$ and $R^{11C}$ each being a halogen such as fluorine, chlorine or bromine.

In particular, $R^{12C}$, $R^{14C}$, $R^{15C}$ and $R^{17C}$ are identical, $R^{13C}$ and $R^{16C}$ are identical, $R^{9C}$ and $R^{11C}$ are identical and $R^{8C}$ and $R^{10C}$ are identical. This is also preferred in the preferred embodiments described above.

The preparation of the transition metal coordination compounds of formula (II) or (IIa) is described, for example, in J. Am. Chem. Soc. 120, p. 4049 ff. (1998), J. Chem. Soc., Chem. Commun. 1998, 849 and WO 98/27124. Preferred complexes B) are 2,6-Bis[1-(2,6-dimethylphenylimino) ethyl]pyridine iron (II) dichloride, 2,6-Bis[1-(2,4,6-trimethylphenylimino)-ethyl]pyridine iron (II) dichloride, 2,6-Bis [1-(2-chloro-4,6-dimethylphenylimino)ethyl]pyridine iron (II) dichloride,2,6-Bis[1-(2-chloro-6-methylphenylimino) ethyl]pyridine iron (II) dichloride, 2,6-Bis[1-(2,6-diisopropylphenylimino)ethyl]pyridine iron (II) dichloride, 2,6-Bis [1-(2,6-dichlorophenylimino)ethyl]pyridine iron (II) dichloride, 2,6-Bis[1-(2,6-diisopropyl phenylimino)methyl] pyridine iron (II) dichloride, 2,6-Bis[1-(2,4-dichloro-6-methylphenylimino)ethyl]pyridine iron (II) dichloride, 2,6-Bis [1-(2,6-difluorophenylimino)ethyl]pyridine iron (II) dichloride, 2,6-Bis[1-(2,6-dibromophenylimino)ethyl]pyridine iron (II) dichloride or the respective dibromides or tribromides.

Preference is given to the supported catalyst system as described above wherein the second transition metal coordination compound (A) is a monocyclopentadienyl complex of a metal of groups 4-6 of the Periodic Table of the Elements whose cyclopentadienyl system is substituted by an uncharged donor (A1) or a hafnocene (A2).

For the purposes of the present invention, an uncharged donor is an uncharged functional group containing an element of group 15 or 16 of the Periodic Table.

Hafnocene catalyst components are, for example, cyclopentadienyl complexes. The cyclopentadienyl complexes can be, for example, bridged or unbridged biscyclopentadienyl complexes as described, for example, in EP 129 368, EP 561 479, EP 545 304 and EP 576 970, monocyclopentadienyl complexes such as bridged amidocyclopentadienyl complexes described, for example, in EP 416 815, multinuclear cyclopentadienyl complexes as described in EP 632 063, pi-ligand-substituted tetrahydropentalenes as described in EP 659 758 or pi-ligand-substituted tetrahydroindenes as described in EP 661 300.

Preference is given to monocyclopentadienyl complexes (A1) containing the following structural feature of the general formula Cp-$Y_m$MA (III), where the variables have the following meanings:

Cp is a cyclopentadienyl system,

Y is a substituent which is bound to Cp and contains at least one uncharged donor containing at least one atom of group 15 or 16 of the Periodic Table, $M^4$ is titanium, zirconium, hafnium, vanadium, niobium, tantalum, chromium, molybdenum or tungsten, in particular chromium, and m is 1, 2 or 3.

Suitable monocyclopentadienyl complexes (A1) contain the structural element of the general formula Cp-$Y_m$$M^4$ (III), where the variables are as defined above. Further ligands can therefore be bound to the metal atom $M^4$. The number of further ligands depends, for example, on the oxidation state of the metal atom. These ligands are not further cyclopentadienyl systems. Suitable ligands include monoanionic and dianionic ligands as have been described, for example, for X. In addition, Lewis bases such as amines, ethers, ketones, aldehydes, esters, sulfides or phosphines can also be bound to the metal center $M^4$. The monocyclopentadienyl complexes can be in monomeric, dimeric or oligomeric form. The monocyclopentadienyl complexes are preferably in monomeric form.

$M^4$ is a metal selected from the group consisting of titanium, zirconium, hafnium, vanadium, niobium, tantalum, chromium, molybdenum and tungsten. The oxidation state of the transition metals $M^4$ in catalytically active complexes is usually known to those skilled in the art. Chromium, molybdenum and tungsten are very probably present in the oxidation state +3, zirconium and hafnium in the oxidation state +4 and titanium in the oxidation state +3 or +4. However, it is also possible to use complexes whose oxidation state does not correspond to that of the active catalyst. Such complexes can then be appropriately reduced or oxidized by means of suitable activators. $M^4$ is preferably titanium in the oxidation state 3, vanadium, chromium, molybdenum or tungsten. Particular preference is given to chromium in the oxidation states 2, 3 and 4, in particular 3.

m can be 1, 2 or 3, i.e. 1, 2 or 3 donor groups Y may be bound to Cp, with these being able to be identical or different when 2 or 3 groups Y are present. Preference is given to only one donor group Y being bound to Cp (m=1).

The uncharged donor Y is an uncharged functional group containing an element of group 15 or 16 of the Periodic Table, e.g. an amine, imine, carboxamide, carboxylic ester, ketone (oxo), ether, thioketone, phosphine, phosphite, phosphine oxide, sulfonyl, sulfonamide or unsubstituted, substituted or fused, partially unsaturated heterocyclic or heteroaromatic ring systems. The donor Y can be bound intermolecularly or intramolecularly to the transition metal $M^4$ or not be bound to it. The donor Y is preferably bound intramolecularly to the metal center $M^4$. Particular preference is given to monocyclopentadienyl complexes containing the structural element of the general formula Cp-Y-$M^4$.

Cp is a cyclopentadienyl system which may be substituted in any way and/or be fused with one or more aromatic, aliphatic, heterocyclic or heteroaromatic rings, with 1, 2 or 3 substituents, preferably 1 substituent, being formed by the group Y and/or 1, 2 or 3 substituents, preferably 1 substituent being substituted by the group Y and/or the aromatic, aliphatic, heterocyclic or heteroaromatic fused-on ring bearing 1, 2 or 3 substituents, preferably 1 substituent. The cyclopentadienyl skeleton itself is a $C_5$ ring system having 6π electrons, in which one of the carbon atoms may also be replaced by nitrogen or phosphorus, preferably phosphorus. Preference is given to using $C_5$ ring systems without replacement by a heteroatom. This cyclopentadienyl skeleton can be, for example, fused with a heteroaromatic containing at least one atom from the group consisting of N, P, O and S or with an aromatic. In this context, fused means that the heterocycle and the cyclopentadienyl skeleton share two atoms, preferably carbon atoms. The cyclopentadienyl system is bound to $M^4$.

Particularly well-suited monocyclopentadienyl complexes (A1) are ones in which Y is formed by the group -$Z_k$-A- and together with the cyclopentadienyl system Cp and $M^4$ forms a monocyclopentadienyl complex containing the structural element of the general formula Cp-$Z_k$-A-$M^A$ (IV), where the variables have the following meanings:

Cp-$Z_k$-A is

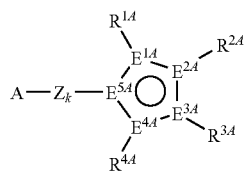

where the variables have the following meanings:

$E^{1A}$-$E^{5A}$ are each carbon or not more than one $E^{1A}$ to $E^{5A}$ phosphorus, $R^{1A}$-$R^{4A}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl radical and 6-20 carbon atoms in the aryl radical, $NR^{5A}_2$, $N(SiR^{5A}_3)_2$, $OR^{5A}$, $OSiR^{5A}_3$, $SiR^{5A}_3$, $BR^{5A}_2$, where the organic radicals $R^{1A}$-$R^{4A}$ may also be substituted by halogens and two vicinal radicals $R^{1A}$-$R^{4A}$ may also be joined to form a five-, six- or seven-membered ring, and/or two vicinal radicals $R^{1A}$-$R^{4A}$ are joined to form a five-, six- or seven-membered heterocycle containing at least one atom from the group consisting of N, P, O and S, the radicals $R^{5A}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl part and 6-20 carbon atoms in the aryl part and two geminal radicals $R^{5A}$ may also be joined to form a five- or six-membered ring, Z is a divalent bridge between A and Cp which is selected from the following group

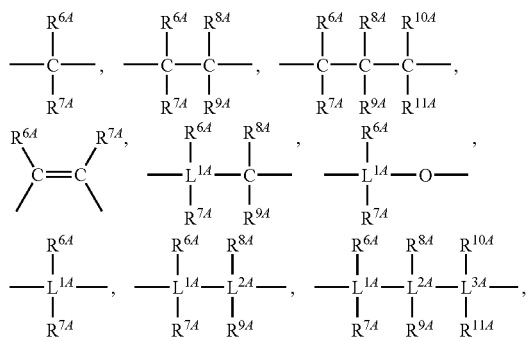

—$BR^{6A}$—, —$BNR^{6A}R^{7A}$—, —$AlR^{6A}$—, —Sn—, —O—, —S—, —SO—, —$SO_2$—, —$NR^{6A}$—, —CO—, —$PR^{6A}$— or —$P(O)R^{6A}$—, where $L^{1A}$-$L^{3A}$ are each, independently of one another, silicon or germanium, $R^{6A}$-$R^{11A}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl part and 6-20 carbon atoms in the aryl part or $SiR^{12A}_3$, where the organic radicals $R^{6A}$-$R^{11A}$ may also be substituted by halogens and two geminal or vicinal radicals $R^{6A}$-$R^{11A}$ may also be joined to form a five- or six-membered ring and the radicals $R^{12A}$ are each, independently of one another, hydrogen, $C_1$-$C_{20}$-alkyl, $C_2$-$C_{20}$-alkenyl, $C_6$-$C_{20}$-aryl or arylalkyl having from 1 to 10 carbon atoms in the alkyl part and 6-20 carbon atoms in the aryl part, $C_1$-$C_{10}$-alkoxy or $C_6$-$C_{10}$-aryloxy and two radicals $R^{12A}$ may also be joined to form a five- or six-membered ring, and A is an uncharged donor group containing one or more atoms of group 15 and/or 16 of the Periodic Table of the Elements, preferably an unsubstituted, substituted or fused, heteroaromatic ring system, $M^A$ is a metal selected from the group consisting of titanium in the oxidation state 3, vanadium, chromium, molybdenum and tungsten, in particular chromium, and k is 0 or 1.

In preferred cyclopentadienyl systems Cp, all $E^{1A}$ to $E^{5A}$ are carbon.

The polymerization behavior of the metal complexes can be influenced by varying the substituents $R^{1A}$-$R^{4A}$. The number and type of substituents can influence the accessibility of the metal atom M for the olefins to be polymerized. In this way, it is possible to modify the activity and selectivity of the catalyst in respect of various monomers, in particular bulky monomers. Since the substituents can also influence the rate of termination reactions of the growing polymer chain, the molecular weight of the polymers formed can also be altered in this way. The chemical structure of the substituents $R^{1A}$ to $R^{4A}$ can therefore be varied within a wide range in order to achieve the desired results and to obtain a tailored catalyst system. Possible carboorganic substituents $R^{1A}$-$R^{4A}$ are, for example, the following: hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-phenylethyl, where two radicals $R^{1A}$ to $R^{4A}$ may also be joined to form a 5-, 6- or 7-membered ring and/or two vicinal radicals $R^{1A}$-$R^{4A}$ may be joined to form a five-, six- or seven-membered heterocycle containing at least one atom from the group consisting of N, P, O and S and/or the organic radicals $R^{1A}$-$R^{4A}$ may also be substituted by halogens such as fluorine, chlorine or bromine. Furthermore, $R^{1A}$-$R^{4A}$ may be amino $NR^{5A}_2$ or $N(SiR^{5A}_3)_2$, alkoxy or aryloxy $OR^{5A}$, for example dimethylamino, N-pyrrolidinyl, picolinyl, methoxy, ethoxy or isopropoxy. The radicals $R^{5A}$ in organosilicone substituents $SiR^{5A}_3$ can be the same carboorganic radicals as described above for $R^{1A}$-$R^{4A}$, where two radicals $R^{5A}$ may also be joined to form a 5- or 6-membered ring, e.g. trimethylsilyl, triethylsilyl, butyldimethylsilyl, tributylsilyl, tritertbutylsilyl, triallylsilyl, triphenylsilyl or dimethylphenylsilyl. These $SiR^{5A}_3$ radicals may also be joined to the cyclopentadienyl skeleton via an oxygen or nitrogen, for example trimethylsilyloxy, triethylsilyloxy, butyldimethylsilyloxy, tributylsilyloxy or tritert-butylsilyloxy. Preferred radicals $R^{1A}$-$R^{4A}$ are hydrogen, methyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Possible organosilicon substituents are, in particular, trialkylsilyl groups having from 1 to 10 carbon atoms in the alkyl radical, in particular trimethylsilyl groups.

Two vicinal radicals $R^{1A}$-$R^{4A}$ together with the $E^{1A}$-$E^{5A}$ bearing them may form a heterocycle, preferably heteroaromatic, containing at least one atom from the group consisting of nitrogen, phosphorus, oxygen and sulfur, particularly preferably nitrogen and/or sulfur, with the $E^{1A}$-$E^{5A}$ present in the heterocycle or heteroaromatic preferably being carbons. Preference is given to heterocycles and heteroaromatics having a ring size of 5 or 6 ring atoms. Examples of 5-membered heterocycles which may contain from one to four nitrogen atoms and/or a sulfur or oxygen atom as ring atoms in addition to carbon atoms are 1,2-dihydrofuran, furan, thiophene, pyrrole, isoxazole, 3-isothiazole, pyrazole, oxazole, thiazole, imidazole, 1,2,4-oxadiazole, 1,2,5-oxadiazole, 1,3,4-oxadiazole, 1,2,3-triazole and 1,2,4-triazole. Examples of 6-membered heteroaryl groups which may contain from one to four nitrogen atoms and/or a phosphorus atom are pyridine, phosphabenzene, pyridazine, pyrimidine, pyrazine, 1,3,5-triazine 1,2,4-triazine or 1,2,3-triazine. The 5-membered and 6-membered heterocycles may also be substituted by $C_1$-$C_{10}$-alkyl, $C_6$-$C_{10}$-aryl, arylalkyl having from 1 to 10 carbon atoms in the alkyl part and 6-10 carbon atoms in the aryl part, trialkylsilyl or halogens such as fluorine, chlorine or bromine, dialkylamide, arylalkylamide, diarylamide, alkoxy or aryloxy or be fused with one or more aromatics or heteroaromatics. Examples of benzo-fused 5-membered heteroaryl groups are indole, indazole, benzofuran, benzothiophene, benzothiazole, benzoxazole and benzimidazole. Examples of benzo-fused 6-membered heteroaryl groups are chroman, benzopyran, quinoline, isoquinoline, cinnoline, phthalazine, quinazoline, quinoxaline, 1,10-phenanthroline and quinolizine. Naming and numbering of the heterocycles has been taken from Lettau, Chemie der Heterocyclen, 1st edition, VEB, Weinheim 1979. The heterocycles/heteroaromatics are preferably fused with the cyclopentadienyl skeleton via a C—C double bond of the heterocycle/heteroaromatic. Heterocycles/heteroaromatics having one heteroatom are preferably 2,3- or b-fused.

Cyclopentadienyl systems Cp having a fused-on heterocycle are, for example, thiapentalene, 2-methylthiapentalene, 2-ethylthiapentalene, 2-isopropylthiapentalene, 2-n-butylthiapentalene, 2-tert-butylthiapentalene, 2-trimethylsilylthiapentalene, 2-phenylthiapentalene, 2-naphthylthiapentalene, 3-methylthiopentalene, 4-phenyl-2,6-dimethyl-1-thiopentalene, 4-phenyl-2,6-diethyl-1-thiopentalene, 4-phenyl-2,6-diisopropyl-1-thiopentalene, 4-phenyl-2,6-di-n-butyl-1-thiopentalene, 4-phenyl-2,6-ditrimethylsilyl-1-thiopentalene, azapentalene, 2-methylazapentalene, 2-ethylazapentalene, 2-isopropylazapentalene, 2-n-butylazapentalene, 2-trimethylsilylazapentalene, 2-phenylazapentalene, 2-naphthylazapentalene, 1-phenyl-2,5-dimethyl-1-azapentalene, 1-phenyl-2,5-diethyl-1-azapentalene, 1-phenyl-2,5-di-n-butyl-1-azapentalene, 1-phenyl-2,5-di-tert-butyl-1-azapentalene, 1-phenyl-2,5-di-trimethylsilyl-1-azapentalene, 1-tert-butyl-2,5-dimethyl-1-azapentalene, oxapentalene, phosphapentalene, 1-phenyl-2,5-dimethyl-1-phosphapentalene, 1-phenyl-2,5-diethyl-1-phosphapentalene, 1-phenyl-2,5-di-n-butyl-1-phosphapentalene, 1-phenyl-2,5-di-tert-butyl-1-phosphapentalene, 1-phenyl-2,5-di-trimethylsilyl-1-phosphapentalene, 1-methyl-2,5-dimethyl-1-phosphapentalene, 1-tert-butyl-2,5-dimethyl-1-phosphapentalene, 7-cyclopenta-[1,2]thiophene[3,4]cyclopentadiene or 7-cyclopenta[1,2]pyrrol[3,4]cyclopentadiene.

In further preferred cyclopentadienyl systems Cp, the four radicals $R^{1A}$-$R^{4A}$, i.e. the two pairs of vicinal radicals, form two heterocycles, in particular heteroaromatics. The heterocyclic systems are the same as those described above.

Cyclopentadienyl systems Cp having two fused heterocycles are, for example, 7-cyclopentadithiophene, 7-cyclopentadipyrrole or 7-cyclopentadiphosphole.

The synthesis of such cyclopentadienyl systems having a fused-on heterocycle is described, for example, in the above-mentioned WO 98/22486. In "metalorganic catalysts for synthesis and polymerisation", Springer Verlag 1999, Ewen et al., p. 150 ff describe further syntheses of these cyclopentadienyl systems.

Particularly preferred substituents $R^{1A}$-$R^{4A}$ are the carboorganic substituents described above and the carboorganic substituents which form a cyclic fused ring system, i.e. together with the $E^{1A}$-$E^{5A}$ cyclopentadienyl skeleton, preferably a $C_5$-cyclopentadienyl skeleton, form, for example, an unsubstituted or substituted indenyl, benzindenyl, phenanthrenyl, fluorenyl or tetrahydroindenyl system, and also, in particular, their preferred embodiments.

Examples of such cyclopentadienyl systems (without the group -Z-A-, which is preferably located in the 1 position) are 3-methylcyclopentadienyl, 3-ethylcyclopentadienyl, 3-isopropylcyclopentadienyl, 3-tert-butylcyclopentadienyl, dialkylalkylcyclopentadienyl such as tetrahydroindenyl, 2,4-dimethylcyclopentadienyl or 3-methyl-5-tert-butylcyclopentadienyl, trialkylcyclopentadienyl such as 2,3,5-trimethylcyclopentadienyl or tetraalkylcyclopentadienyl such as 2,3,4,5-tetramethylcyclopentadienyl, and also indenyl, 2-methylindenyl, 2-ethylindenyl, 2-isopropylindenyl, 3-methylindenyl, benzindenyl and 2-methylbenzindenyl. The fused ring system may bear further $C_1$-$C_{20}$-alkyl, $C_2$-$C_{20}$-alkenyl, $C_6$-$C_{20}$-aryl, arylalkyl having from 1 to 10 carbon atoms in the alkyl part and 6-20 carbon atoms in the aryl part, $NR^{5A}_2$, $N(SiR^{5A}_3)_2$, $OR^{5A}$, $OSiR^{5A}_3$ or $SiR^{5A}_3$, e.g. 4-methylindenyl, 4-ethylindenyl, 4-isopropylindenyl, 5-methylindenyl, 4-phenylindenyl, 5-methyl-4-phenylindenyl, 2-methyl-4-phenylindenyl or 4-naphthylindenyl.

In a particularly preferred embodiment, one of the substituents $R^{1A}$-$R^{4A}$, preferably $R^{2A}$, is a $C_6$-$C_{22}$-aryl or an arylalkyl having from 1 to 10 carbon atoms in the alkyl part and 6-20 carbon atoms in the aryl part, preferably $C_6$-$C_{22}$-aryl such as phenyl, naphthyl, biphenyl, anthracenyl or phenanthrenyl, where the aryl may also be substituted by N-, P-, O- or S-containing substituents, $C_1$-$C_{22}$-alkyl, $C_2$-$C_{22}$-alkenyl, halogens or haloalkyls or haloaryls having 1-10 carbon atoms, for example o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, o-, m-, p-dimethylaminophenyl, o-, m-, p-methoxyphenyl, o-, m-, p-fluorophenyl, o-, m-, p-chlorophenyl, o-, m-, p-trifluoromethylphenyl, 2,3-, 2,4-, 2,5- or 2,6-difluorophenyl, 2,3-, 2,4-, 2,5- or 2,6-dichlorophenyl or 2,3-, 2,4-, 2,5- or 2,6-di(trifluoromethyl)phenyl. The N-, P-, O- or S-containing substituents, $C_1$-$C_{22}$-alkyl, $C_2$-$C_{22}$-alkenyl, halogens or haloalkyls or haloaryls having 1-10 carbon atoms as substituents on the aryl radical are preferably located in the para position relative to the bond to the cyclopentadienyl ring. The aryl substituent can be bound in the vicinal position relative to the substituent -Z-A or the two substituents are located relative to one another in the 1,3 positions on the cyclopentadienyl ring. -Z-A and the aryl substituent are preferably present in the 1,3 positions relative to one another on the cyclopentadienyl ring.

As in the case of the metallocenes, the monocyclopentadienyl complexes (A1) can be chiral. Thus, one of the substituents $R^{1A}$-$R^{4A}$ of the cyclopentadienyl skeleton can have one or more chiral centers or the cyclopentadienyl system Cp itself can be enantiotopic so that chirality is induced only when it is bound to the transition metal M (for the formalism regarding chirality in cyclopentadienyl compounds, see R. Halterman, Chem. Rev. 92, (1992), 965-994).

The bridge Z between the cyclopentadienyl system Cp and the uncharged donor A is a divalent organic bridge (k=1) which preferably consists of carbon- and/or silicon- and/or boron-containing bridge members. The activity of the catalyst can be influenced by changing the length of the linkage between the cyclopentadienyl system and A. Z is preferably bound to the cyclopentadienyl skeleton next to the fused-on heterocycle or fused-on aromatic. Thus, if the heterocycle or aromatic is fused on in the 2,3 positions of the cyclopentadienyl skeleton, then Z is preferably located in the 1 or 4 position of the cyclopentadienyl skeleton.

Possible carboorganic substituents $R^{6A}$-$R^{11A}$ on the linkage Z are, for example, the following: hydrogen, $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphen-1-yl, 2,3,4-, 2,3,5-, 2,3,6-, 2,4,5-, 2,4,6- or 3,4,5-trimethylphen-1-yl, or arylalkyl which may be substituted by further alkyl groups, e.g. benzyl, o-, m-, p-methylbenzyl, 1- or 2-phenylethyl, where two $R^{6A}$ to $R^{11A}$ may also be joined to form a 5- or 6-membered ring, for example cyclohexane, and the organic radicals $R^{6A}$-$R^{11A}$ may also be substituted by halogens such as fluorine, chlorine or bromine, for example pentafluorophenyl or bis-3,5-trifluoromethylphen-1-yl and alkyl or aryl.

The radicals $R^{12A}$ in organosilicon substitutents $SiR^{12A}_3$ can be the same radicals as mentioned above for $R^{5A}$-$R^{11A}$, where two radicals $R^{12A}$ may also be joined to form a 5- or 6-membered ring, e.g. trimethylsilyl, triethylsilyl, butyidimethylsilyl, tributylsilyl, tritert-butylsilyl, triallylsilyl, triphenyl-silyl or dimethylphenylsilyl. Preferred radicals $R^{5A}$-$R^{11A}$ are hydrogen, methyl, ethyl, n-propyl, iso-propyl, n-butyl, isobutyl, tert-butyl, n-pentyl, n-hexyl, n-heptyl, n-octyl, benzyl, phenyl, ortho-dialkyl- or dichloro-substituted phenyls, trialkyl- or trichloro-substituted phenyls, naphthyl, biphenyl and anthranyl.

Particularly preferred substituents $R^{6A}$ to $R^{11A}$ are hydrogen, $C_1$-$C_{20}$-alkyl which may be linear or branched, e.g. methyl, ethyl, n-propyl, n-butyl, isobutyl, tert-butyl, n-pentyl, n-hexyl, n-heptyl, n-octyl, n-nonyl, n-decyl or n-dodecyl, $C_6$-$C_{20}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphen-1-yl, 2,3,4-, 2,3,5-, 2,3,6-, 2,4,5-, 2,4,6- or 3,4,5-trimethylphen-1-yl, or arylalkyl which may be substituted by further alkyl groups, e.g. benzyl, o-, m-, p-methylbenzyl, 1- or 2-phenylethyl where two radicals $R^{6A}$ to $R^{11A}$ may also be joined to form a 5- or 6-membered ring, for example cyclohexane, and the organic radicals $R^{6A}$-$R^{2B}$ may also be substituted by halogens such as fluorine, chlorine or bromine, in particular fluorine, for example pentafluorophenyl or bis-3,5-trifluoromethylphen-1-yl and alkyl or aryl. Particular preference is given to methyl, ethyl, 1-propyl, 2-isopropyl, 1-butyl, 2-tert-butyl, phenyl and pentafluorophenyl.

Z is preferably a group —$CR^{6A}R^{7A}$—, —$SiR^{6A}R^{7A}$—, in particular —$Si(CH_3)_2$—, —$CR^{6A}R^{7A}CR^{8A}R^{9A}$—, —$SiR^{6A}R^{7A}CR^{8A}R^{9A}$— or substituted or unsubstituted 1,2-phenylene and in particular —$CR^{6A}R^{7A}$—. The preferred embodiments of the substituents $R^{6A}$ to $R^{11A}$ described above are likewise preferred embodiments here. Preference is given to —$CR^{6A}R^{7A}$— being a —$CHR^{6A}$—, —$CH_2$— or —$C(CH_3)_2$— group. The group —$SiR^{6A}R^{7A}$— in -$L^{1A}R^{6A}R^{7A}CR^{8A}R^{9A}$— can be bound to the cyclopentadienyl system or to A. This group —$SiR^{6A}R^{7A}$— or a preferred embodiment thereof is preferably bound to Cp.

k is 0 or 1; in particular, k is 1 or when A is an unsubstituted, substituted or fused, heterocyclic ring system may also be 0. Preference is given to k being 1.

A is an uncharged donor containing an atom of group 15 or 16 of the Periodic Table, preferably one or more atoms selected from the group consisting of oxygen, sulfur, nitrogen and phosphorrus, preferably nitrogen and phosphorus. The donor function in A can bind intermolecularly or intramolecularly to the metal $M^A$. The donor in A is preferably bound intramolecularly to M. Possible donors are uncharged functional groups containing an element of group 15 or 16 of the Periodic Table, e.g. amine, imine, carboxamide, carboxylic ester, ketone (oxo), ether, thioketone, phosphine, phosphite, phosphine oxide, sulfonyl, sulfonamide or unsubstituted, substituted or fused, heterocyclic ring systems. The attachment of A to the cyclopentadienyl radical and Z can be carried out synthetically by, for example, a method analogous to that described in WO 00/35928.

A is preferably a group selected from among —$OR^{13A}$—, —$SR^{13A}$—, —$NR^{13A}R^{14A}$—, —$PR^{13A}R^{14A}$—, —$C=NR^{13A}$— and unsubstituted, substituted or fused heteroaromatic ring systems, in particular —$NR^{13A}R^{14A}$—, —$C=NR^{13A}$— and unsubstituted, substituted or fused heteroaromatic ring systems.

$R^{13A}$ and $R^{14A}$ are each, independently of one another, hydrogen, $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphen-1-yl, 2,3,4-, 2,3,5-, 2,3,6-, 2,4,5-, 2,4,6- or 3,4,5-trimethylphen-1-yl, arylalkyl which has from 1 to 10 carbon atoms in the alkyl part and 6-20 carbon atoms in the aryl part and may be substituted by further alkyl groups, e.g. benzyl, o-, m-, p-methylbenzyl, 1- or 2-phenylethyl or $SiR^{15A}_3$, where the organic radicals $R^{13A}$-$R^{14A}$ may also be substituted by halogens such as fluorine, chlorine or bromine or nitrogen-containing groups and further $C_1$-$C_{20}$-alkyl, $C_2$-$C_{20}$-alkenyl, $C_6$-$C_{20}$-aryl, arylalkyl having from 1 to 10 carbon atoms in the alkyl part and 6-20 carbon atoms in the aryl part or SiR$^{15A}_3$ groups and two vicinal radicals R$^{13A}$-R$^{14A}$ may also be joined to form a five- or six-membered ring and the radicals R$^{15A}$ are each, independently of one another, hydrogen, C$_1$-C$_{20}$-alkyl, C$_2$-C$_{20}$-alkenyl, C$_6$-C$_{20}$-aryl or arylalkyl having from 1 to 10 carbon atoms in the alkyl part and 6-20 carbon atoms in the aryl part and two radicals R$^{15A}$ may also be joined to form a five- or six-membered ring.

NR$^{13A}$R$^{14A}$ is an amide substituent. It is preferably a secondary amide such as dimethylamide, N-ethylmethylamide, diethylamide, N-methylpropylamide, N-methylisopropylamide, N-ethylisopropylamide, dipropylamide, diisopropylamide, N-methylbutylamide, N-ethylbutylamide, N-methyl-tert-butylamide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octyl-amide, dioctylamide, bis(2-ethylhexyl) amide, didecylamide, N-methyloctadecylamide, N-methylcyclohexylamide, N-ethylcyclohexylamide, N-isopropylcyclohexylamide, N-tert-butylcyclohexylamide, dicyclohexylamide, pyrrolidine, piperidine, hexamethylenimine, decahydroquinoline, diphenylamine, N-methylanilide or N-ethylanilide.

In the imino group —C=NR$^{13A}$, R$^{13A}$ is preferably a C$_6$-C$_{20}$-aryl radical which may be substituted by further alkyl groups, e.g. phenyl, naphthyl, biphenyl, anthranyl, o-, m-, p-methylphenyl, 2,3-, 2,4-, 2,5- or 2,6-dimethylphen-1-yl, 2,3,4-, 2,3,5-, 2,3,6-, 2,4,5-, 2,4,6- or 3,4,5-trimethylphen-1-yl.

A is preferably an unsubstituted, substituted or fused heteroaromatic ring system which can contain heteroatoms from the group consisting of oxygen, sulfur, nitrogen and phosphorus in addition to ring carbons. Examples of 5-membered heteroaryl groups which may contain from one to four nitrogen atoms or from one to three nitrogen atoms and/or a sulfur or oxygen atom as ring members in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups which may contain from one to four nitrogen atoms and/or a phosphorus atom are 2-pyridinyl, 2-phosphabenzenyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered and 6-membered heteroaryl groups may also be substituted by C$_1$-C$_{10}$-alkyl, C$_6$-C$_{10}$-aryl, arylalkyl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, 3$^{rd}$ revised edition, Verlag Chemie, Weinheim 1957.

Among these heteroaromatic systems A, particular preference is given to unsubstituted, substituted and/or fused six-membered heteroaromatics having 1, 2, 3, 4 or 5 nitrogen atoms in the heteroaromatic part, in particular substituted and unsubstituted 2-pyridyl or 2-quinolyl. A is therefore preferably a group of the formula (VI)

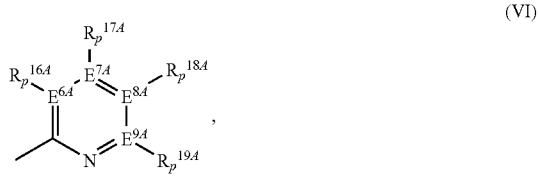

where

E$^{6A}$-E$^{9A}$ are each, independently of one another, carbon or nitrogen,

R$^{16A}$-R$^{19A}$ are each, independently of one another, hydrogen, C$_1$-C$_{20}$-alkyl, C$_2$-C$_{20}$-alkenyl, C$_6$-C$_{20}$-aryl, arylalkyl having from 1 to 10 carbon atoms in the alkyl part and 6-20 carbon atoms in the aryl part or SiR$^{20A}_3$, where the organic radicals R$^{16A}$-R$^{19A}$ may also be substituted by halogens or nitrogen and further C$_1$-C$_{20}$-alkyl, C$_2$-C$_{20}$-alkenyl, C$_6$-C$_{20}$-aryl, arylalkyl having from 1 to 10 carbon atoms in the alkyl part and 6-20 carbon atoms in the aryl part or SiR$^{20A}_3$ and two vicinal radicals R$^{16A}$-R$^{19A}$ or R$^{16A}$ and Z may also be joined to form a five- or six-membered ring and the radicals R$^{20A}$ are each, independently of one another, hydrogen, C$_1$-C$_{20}$-alkyl, C$_2$-C$_{20}$-alkenyl, C$_6$-C$_{20}$-aryl or arylalkyl having from 1 to 10 carbon atoms in the alkyl radical and 6-20 carbon atoms in the aryl radical and two radicals R$^{20A}$ may also be joined to form a five- or six-membered ring and p is 0 when E$^{6A}$-E$^{9A}$ is nitrogen and is 1 when E$^{6A}$-E$^{9A}$ is carbon.

In particular, 0 or 1 E$^{6A}$-E$^{9A}$ are nitrogen and the remainder are carbon. A is particularly preferably a 2-pyridyl, 6-methyl-2-pyridyl, 4-methyl-2-pyridyl, 5-methyl-2-pyridyl, 5-ethyl-2-pyridyl, 4,6-dimethyl-2-pyridyl, 3-pyridazyl, 4-pyrimidyl, 6-methyl-4-pyrimidyl, 2-pyrazinyl, 6-methyl-2-pyrazinyl, 5-methyl-2-pyrazinyl, 3-methyl-2-pyrazinyl, 3-ethylpyrazinyl, 3,5,6-trimethyl-2-pyrazinyl, 2-quinolyl, 4-methyl-2-quinolyl, 6-methyl-2-quinolyl, 7-methyl-2-quinolyl, 2-quinoxalyl or 3-methyl-2-quinoxalyl.

Owing to the ease of preparation, preferred combinations of Z and A are those in which Z is unsubstituted or substituted 1,2-phenylene and A is NR$^{16A}$R$^{17A}$ and those in which Z is —CHR$^{6A}$—, —CH$_2$—, —C(CH$_3$)$_2$ or —Si(CH$_3$)$_2$—and A is unsubstituted or substituted 2-quinolyl or unsubstituted or substituted 2-pyridyl. Systems without a bridge Z, in which k is 0, are also very particularly simple to synthesize. A is preferably unsubstituted or substituted 8-quinolyl in this case. In addition, when k is 0, R$^{2A}$ is preferably a C$_6$-C$_{22}$-aryl or an arylalkyl having from 1 to 10 carbon atoms in the alkyl part and 6-20 carbon atoms in the aryl part, preferably C$_6$-C$_{22}$-aryl such as phenyl, naphthyl, biphenyl, anthracenyl or phenanthrenyl, where the aryl may also be substituted by N-, P-, O- or S-containing substituents, C$_1$-C$_{22}$-alkyl, C$_2$-C$_{22}$-alkenyl, halogens or haloalkyls or haloaryls having 1-10 carbon atoms.

The preferred embodiments described above for the variables are also preferred in these preferred combinations.

M$^A$ is a metal selected from the group consisting of titanium in the oxidation state 3, vanadium, chromium, molybdenum and tungsten, preferably titanium in the oxidation state 3 and chromium. Particular preference is given to chromium in the oxidation states 2, 3 and 4, in particular 3. The metal complexes, in particular the chromium complexes, can be obtained in a simple manner by reacting the appropriate metal salts, e.g. metal chlorides, with the ligand anion (e.g. using a method analogous to the examples in DE 197 10615).

Among the suitable monocyclopentadienyl complexes (A1), preference is given to those of the formula $Cp\text{-}Y_m\text{-}M^A X^A_n$ (VII) where the variables Cp, Y, A, m and $M^A$ are as defined above and their preferred embodiments are also preferred here and:

$X^A$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, arylalkyl having 1-10 carbon atoms in the alkyl part and 6-20 carbon atoms in the aryl part, $NR^{21A}R^{22A}$, $OR^{21A}$, $SR^{21A}$, $SO_3R^{21A}$, $OC(O)R^{21A}$, CN, SCN, β-diketonate, CO, $BF_4^-$, $PF_6^-$ or a bulky noncoordinating anion or two radicals $X^A$ form a substituted or unsubstituted diene ligand, in particular a 1,3-diene ligand, and the radicals $X^A$ may be joined to one another, $R^{21A}$-$R^{22A}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl part and 6-20 carbon atoms in the aryl part, $SiR^{23A}_3$, where the organic radicals $R^{21A}$-$R^{22A}$ may also be substituted by halogens or nitrogen- and oxygen-containing groups and two radicals $R^{21A}$-$R^{22A}$ may also be joined to form a five- or six-membered ring, the radicals $R^{23A}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl part and 6-20 carbon atoms in the aryl part and two radicals $R^{23A}$ may also be joined to form a five- or six-membered ring and n is 1, 2, or 3.

The embodiments and preferred embodiments described above for Cp, Y, Z, A, m and $M^A$ also apply individually and in combination to these preferred monocyclopentadienyl complexes.

The ligands $X^A$ result, for example, from the choice of the appropriate starting metal compounds used for the synthesis of the monocyclopentadienyl complexes, but can also be varied afterwards. Possible ligands $X^A$ are, in particular, the halogens such as fluorine, chlorine, bromine or iodine, especially chlorine. Alkyl radicals such as methyl, ethyl, propyl, butyl, vinyl, allyl, phenyl or benzyl are also advantageous ligands $X^A$. Further ligands $X^A$ which may be mentioned, purely by way of example and in no way exhaustively, are trifluoroacetate, $BF_4^-$, $PF_6^-$ and also weakly coordinating or noncoordinating anions (cf., for example, S. Strauss in Chem. Rev. 1993, 93, 927-942), e.g. $B(C_6F_5)_4^-$.

Amides, alkoxides, sulfonates, carboxylates and β-diketonates are also particularly useful ligands $X^A$. Variation of the radicals $R^{21A}$ and $R^{22A}$ enables, for example, physical properties such as solubility to be finely adjusted. Possible carboorganic substituents $R^{21A}$-$R^{22A}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N- or O-containing radicals, e.g. phenyl, naphthyl, biphenyl, anthranyl, o-, m-, p-methylphenyl, 2,3-, 2,4-, 2,5- or 2,6-dimethylphenyl, 2,3, 4-, 2,3,5-, 2,3,6-, 2,4,5-, 2,4,6- or 3,4,5-trimethylphenyl, 2-methoxyphenyl, 2-N,N-dimethylaminophenyl or arylalkyl, where the arylalkyl may be substituted by further alkyl groups, e.g. benzyl, o-, m-, p-methylbenzyl, 1- or 2-phenylethyl, where $R^{21A}$ may also be joined to $R^{22A}$ to form a 5- or 6-membered ring and the organic radicals $R^{21A}$-$R^{22A}$ may also be substituted by halogens such as fluorine, chlorine or bromine. Possible radicals $R^{23A}$ in organosilicon substituents $SiR^{23A}_3$ are the same radicals as have been mentioned above for $R^{21A}$-$R^{22A}$, where two $R^{23A}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl and also vinyl allyl, benzyl and phenyl as radicals $R^{21A}$ and $R^{22A}$. Some of these substituted ligands X are particularly preferably used since they are obtainable from cheap and readily available starting materials. Thus, a particularly preferred embodiment is that in which $X^A$ is dimethylamide, methoxide, ethoxide, isopropoxide, phenoxide, naphthoxide, triflate, p-toluenesulfonate, acetate or acetylacetonate.

The number n of ligands $X^A$ depends on the oxidation state of the transition metal $M^A$. The number n can thus not be given in general terms. The oxidation state of transition metals $M^A$ in catalytically active complexes is usually known to those skilled in the art. Chromium, molybdenum and tungsten are very probably present in the oxidation state +3, vanadium in the oxidation state +3 or +4. However, it is also possible to use complexes whose oxidation state does not correspond to that of the active catalyst. Such complexes can then be appropriately reduced or oxidized by means of suitable activators. Preference is given to using chromium complexes in the oxidation state +3 and titanium complexes in the oxidation state 3.

Preferred monocyclopentadienyl complexes (A1) of this type are 1-(8-quinolyl)-3-phenylcyclopentadienylchromium (III) dichloride, 1-(8-quinolyl)-3-(1-naphthyl)cyclopentadienylchromium (III) dichloride, 1-(8-quinolyl)-3-(4-trifluoromethylphenyl)cyclopentadienylchromium (III) dichloride, 1-(8-quinolyl)-3-(4-chlorophenyl)cyclopentadienylchromium (III) dichloride, 1-(8-quinolyl)-2-methyl-3-phenylcyclopentadienylchromium (III) dichloride, 1-(8-quinolyl)-2-methyl-3-(1-naphthyl)cyclopentadienylchromium (III) dichloride, 1-(8-quinolyl)-2-methyl-3-(4-trifluoromethylphenyl)cyclopentadienylchromium (III) dichloride, 1-(8-quinolyl)-2-methyl-3-(4-chlorophenyl)cyclopentadienylchromium (III) dichloride, 1-(8-quinolyl)-2-phenylindenylchromium (III) dichloride, 1-(8-quinolyl)-2-phenylbenzindenylchromium (III) dichloride, 1-(8-(2-methylquinolyl))-2-methyl-3-phenylcyclopentadienylchromium (III) dichloride, 1-(8-(2-methylquinolyl))-2-phenylindenylchromium (III) dichloride, 1-(2-pyridylmethyl)-3-phenylcyclopentadienylchromium (III) dichloride, 1-(2-pyridylmethyl)-2-methyl-3-phenylcyclopentadienylchromium (III) dichloride, 1-(2-quinolylmethyl)-3-phenylcyclopentadienylchromium dichloride, 1-(2-pyridylethyl)-3-phenylcyclopentadienylchromium dichloride, 1-(2-pyridyl-1-methylethyl)-3-phenylcyclopentadienylchromium dichloride, 1-(2-pyridyl-1-phenylmethyl)-3-phenylcyclopentadienylchromium dichloride, 1-(2-pyridylmethyl)indenylchromium (III) dichloride, 1-(2-quinolylmethyl)indenylchromium dichloride, 1-(2-pyridylethyl)indenylchromium dichloride, 1-(2-pyridyl-1-methylethyl)indenylchromium dichloride, 1-(2- pyridyl-1-phenylmethyl)indenylchromium dichloride, 5-[(2-pyridyl)methyl]-1,2,3,4-tetramethylcyclopentadienylchromium dichloride and 1-(8-(2-methylquinolyl))-2-methylbenzindenylchromium (III) dichloride.

The preparation of such functional cyclopentadienyl ligands is known. Various synthetic routes to these complexing ligands are described by, for example, M. Enders et al., in Chem. Ber. (1996), 129, 459-463 or P. Jutzi and U. Siemeling in J. Orgmet. Chem. (1995), 500, 175-185.

The synthesis of such complexes can be carried out by methods known per se, with the reaction of the appropriately substituted, cyclic hydrocarbon anions with halides of titanium, vanadium or chromium being preferred. Examples of appropriate preparative methods are described, for example, in Journal of Organometallic Chemistry, 369 (1989), 359-370 and in EP-A-1212333.

Particularly suitable hafnocenes (A2) are hafnium complexes of the general formula (VIII)

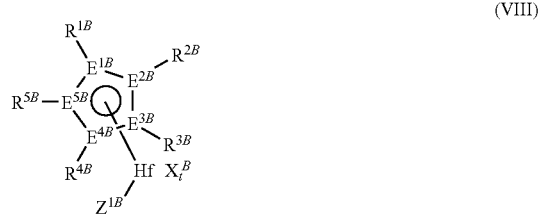

(VIII)

where the substituents and indices have the following meanings:

$X^B$ is fluorine, chlorine, bromine, iodine, hydrogen, $C_1$-$C_{10}$-alkyl, $C_2$-$C_{10}$-alkenyl, $C_6$-$C_{15}$-aryl, arylalkyl having from 1 to 10 carbon atoms in the alkyl part and from 6 to 20 carbon atoms in the aryl part, —$OR^{6B}$ or —$NR^{6B}R^{7B}$, or two radicals $X^B$ form a substituted or unsubstituted diene ligand, in particular a 1,3-diene ligand, and the radicals $X^B$ are identical or different and may be joined to one another, $E^{1B}$-$E^{5B}$ are each carbon or not more than one $E^{1B}$ to $E^{5B}$ is phosphorus or nitrogen, preferably carbon, t is 1, 2 or 3 and is, depending on the valence of Hf, such that the metallocene complex of the general formula (VI) is uncharged, where $R^{6B}$ and $R^{7B}$ are each $C_1$-$C_{10}$-alkyl, $C_6$-$C_{15}$-aryl, arylalkyl, arylalkyl, fluoroalkyl or fluoroaryl each having from 1 to 10 carbon atoms in the alkyl part and from 6 to 20 carbon atoms in the aryl part and $R^{1B}$ to $R^{5B}$ are each, independently of one another hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and from 6 to 21 carbon atoms in the aryl part, $NR^{8B}{}_2$, $N(SiR^{8B}{}_3)_2$, $OR^{8B}$, $OSiR^{8B}{}_3$, $SiR^{8B}{}_3$, where the organic radicals $R^{1B}$-$R^{5B}$ may also be substituted by halogens and/or two radicals $R^{1B}$-$R^{5B}$, in particular vicinal radicals, may also be joined to form a five-, six- or seven-membered ring, and/or two vicinal radicals $R^{1D}$-$R^{5D}$ may be joined to form a five-, six- or seven-membered heterocycle containing at least one atom from the group consisting of N, P, O and S, where the radicals $R^{8B}$ can be identical or different and can each be $C_1$-$C_{10}$-alkyl, $C_3$-$C_{10}$cycloalkyl, $C_6$-$C_{15}$-aryl, $C_1$-$C_4$-alkoxy or $C_6$-$C_{10}$-aryloxy and $Z^{1B}$ is $X^B$ or

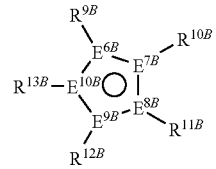

where the radicals $R^{9B}$ to $R^{13B}$ are each, independently of one another, hydrogen, $C_1$-$C_{22}$-alkyl, 5 to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and 6-21 carbon atoms in the aryl part, $NR^{14B}{}_2$, $N(SiR^{14B}{}_3)_2$, $OR^{14B}$, $OSiR^{14B}{}_3$, $SiR^{14B}{}_3$, where the organic radicals $R^{9B}$-$R^{13B}$ may also be substituted by halogens and/or two radicals $R^{9B}$-$R^{13B}$, in particular vicinal radicals, may also be joined to form a five-, six- or seven-membered ring, and/or two vicinal radicals $R^{9B}$-$R^{13B}$ may be joined to form a five-, six- or seven-membered heterocycle containing at least one atom from the group consisting of N, P, O and S, where the radicals $R^{14B}$ are identical or different and are each $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, $E^{6B}$-$E^{10B}$ are each carbon or not more than one $E^{6B}$ to $E^{10B}$ is phosphorus or nitrogen, preferably carbon, or where the radicals $R^{4B}$ and $Z^{1B}$ together form an —$R^{15B}{}_v$-$A^{1B}$- group, where $R^{15B}$ is

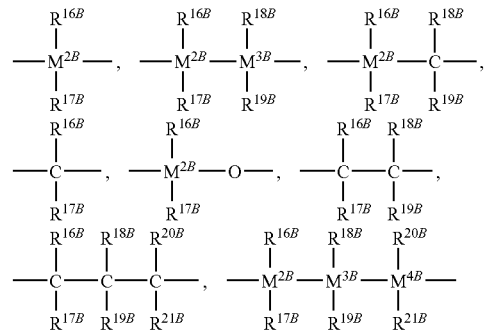

=$BR^{16B}$, =$BNR^{16B}R^{17B}$, =$AlR^{16B}$, —Ge—, —Sn—, —O—, —S—, =SO, =$SO_2$, =$NR^{16B}$, =CO, =$PR^{16B}$ or =$P(O)R^{16B}$, where $R^{16B}$-$R^{21B}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and $M^{2B}$-$M^{4B}$ are each silicon, germanium or tin, or preferably silicon, $A^{1B}$ is

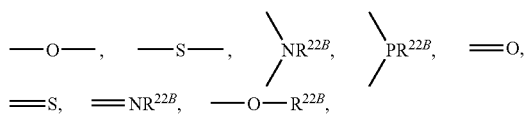

$-NR^{22B}{}_2$, $-PR^{22B}{}_2$ or an unsubstituted, substituted or fused, heterocyclic ring system, where the radicals $R^{22B}$ are each, independently of one another, $C_1$-$C_{10}$-alkyl, $C_6$-$C_{15}$-aryl, $C_3$-$C_{10}$-cycloalkyl, $C_7$-$C_{18}$-arylalkyl or $Si(R^{23B})_3$, $R^{23B}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl, v is 1 or when $A^{1B}$ is an unsubstituted, substituted or fused, heterocyclic ring system may also be 0 or where the radicals $R^{4B}$ and $R^{12B}$ together form an $—R^{15B}—$ group.

$A^{1B}$ can, for example together with the bridge $R^{15B}$, form an amine, ether, thioether or phosphine. However, $A^{1B}$ can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups which can contain from one to four nitrogen atoms and/or a sulfur or oxygen atom as ring members in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups which may contain from one to four nitrogen atoms and/or a phosphorus atom are 2-pyridinyl, 2-phosphabenzenyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-4-yl. The 5-membered and 6-membered heteroaryl groups may also be substituted by $C_1$-$C_{10}$-alkyl, $C_6$-$C_{10}$-aryl, arylalkyl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, 3$^{rd}$ revised edition, Verlag Chemie, Weinheim 1957

The radicals $X^B$ in the general formula (XIII) are preferably identical, preferably fluorine, chlorine, bromine, $C_1$-$C_7$-alkyl or aralkyl, in particular chlorine, methyl or benzyl.

The synthesis of such complexes can be carried out by methods known per se, with the reaction of the appropriately substituted cyclic hydrocarbon anions with halides of hafnium being preferred. Examples of appropriate preparative methods are described, for example, in Journal of Organometallic Chemistry, 369 (1989), 359-370.

The hafnocenes can be used in the Rac or pseudo-Rac form. The term pseudo-Rac refers to complexes in which the two cyclopentadienyl ligands are in the Rac arrangement relative to one another when all other substituents of the complex are disregarded.

Examples of suitable hafnocenes (A2) are, inter alia, methylenebis(cyclopentadienyl)hafnium dichloride, methylenebis(3-methylcyclopentadienyl)hafnium dichloride, methylenebis(3-n-butylcyclopentadienyl)hafnium dichloride, methylenebis(indenyl)hafnium dichloride, methylenebis(tetrahydroindenyl) hafnium dichloride, isopropylidenebis(cyclopentadienyl)hafnium dichloride, isopropylidenebis(3-trimethylsilylcyclopentadienyl)hafnium dichloride, isopropylidenebis(3-methylcyclopentadienyl)hafnium dichloride, isopropylidenebis(3-n-butylcyclopentadienyl) hafnium dichloride, isopropylidenebis(3-phenylcyclopentadienyl)hafnium dichloride, isopropylidenebis(indenyl) hafnium dichloride, isopropylidenebis(tetrahydroindenyl) hafnium dichloride, dimethylsilanediylbis(cyclopentadienyl)hafnium dichloride, dimethylsilanediylbis(indenyl)hafnium dichloride, dimethylsilanediylbis(tetrahydroindenyl)hafnium dichloride, ethylenebis(cyclopentadienyl)hafnium dichloride, ethylenebis(indenyl)hafnium dichloride, ethylenebis(tetrahydroindenyl) hafnium dichloride, tetramethylethylene-9-fluorenylcyclopentadienylhafnium dichloride, dimethylsilanediylbis(tetramethylcyclopentadienyl)hafnium dichloride, dimethylsilanediylbis(3-trimethylsilylcyclopentadienyl)hafnium dichloride, dimethylsilanediylbis(3-methylcyclopentadienyl)hafnium dichloride, dimethylsilanediylbis(3-n-butylcyclopentadienyl)hafnium dichloride, dimethylsilanediylbis(3-tert-butyl-5-methylcyclopentadienyl)hafnium dichloride, dimethylsilanediylbis(3-tert-butyl-5-ethylcyclopentadienyl)hafnium dichloride, dimethylsilanediylbis(2-methylindenyl)hafnium dichloride, dimethylsilanediylbis(2-isopropylindenyl)hafnium dichloride, dimethylsilanediylbis(2-tert-butylindenyl)hafnium dichloride, diethylsilanediylbis(2-methylindenyl)hafnium dibromide, dimethylsilanediylbis(3-methyl-5-methylcyclopentadienyl)hafnium dichloride, dimethylsilanediylbis(3-ethyl-5-isopropylcyclopentadienyl)hafnium dichloride, dimethylsilanediylbis(2-ethylindenyl)hafnium dichloride, dimethylsilanediylbis(2-methyl-4,5-benzindenyl)hafnium dichloride, dimethylsilanediylbis(2-ethyl-4,5-benzindenyl) hafnium dichloride, methylphenylsilanediylbis(2-methyl-4,5-benzindenyl)hafnium dichloride, methylphenylsilanediylbis(2-ethyl-4,5-benzindenyl)hafnium dichloride, diphenylsilanediylbis(2-methyl-4,5-benzindenyl)hafnium dichloride, diphenylsilanediylbis(2-ethyl-4,5-benzindenyl) hafnium dichloride, diphenylsilanediylbis(2-methylindenyl) hafnium dichloride, dimethylsilanediylbis(2-methyl-4-phenylindenyl)hafnium dichloride, dimethylsilanediylbis(2-ethyl-4-phenylindenyl)hafnium dichloride, dimethylsilanediylbis(2-methyl-4-(1-naphthyl)indenyl) hafnium dichloride, dimethylsilanediylbis(2-ethyl-4-(1-naphthyl)indenyl)hafnium dichloride, dimethylsilanediylbis(2-propyl-4-(1-naphthyl)indenyl)hafnium dichloride, dimethylsilanediylbis(2-i-butyl-4-(1-naphthyl)indenyl) hafnium dichloride, dimethylsilanediylbis(2-propyl-4-(9-phenanthryl)indenyl)hafnium dichloride, dimethylsilanediylbis(2-methyl-4-isopropylindenyl)hafnium dichloride, dimethylsilanediylbis(2,7-dimethyl-4-isopropylindenyl)hafnium dichloride, dimethylsilanediylbis(2-methyl-4,6-diisopropylindenyl)hafnium dichloride, dimethylsilanediylbis(2-methyl-4-[4'-trifluoromethylphenyl]indenyl) hafnium dichloride, dimethylsilanediylbis(2-methyl-4-[3',5'-dimethylphenyl]indenyl)hafnium dichloride, dimethylsilanediylbis(2-methyl-4-[4'-tert-butylphenyl]indenyl)hafnium dichloride, diethylsilanediylbis(2-methyl-4-[4'-tert-butylphenyl]indenyl)hafnium dichloride, dimethylsilanediylbis(2-ethyl-4-[4'-tert-butylphenyl]indenyl)hafnium dichloride, dimethylsilanediylbis(2-propyl-4-[4'-tert-butylphenyl]indenyl)hafnium dichloride, dimethylsilanediylbis(2-isopropyl-4-[4'-tert-butylphenyl]indenyl)hafnium dichloride, dimethylsilanediylbis(2-n-butyl-4-[4'-tert-butylphenyl]indenyl)hafnium dichloride, dimethylsilanediylbis(2-hexyl-4-[4'-tert-butylphenyl]indenyl)hafnium dichloride, dimethylsilanediyl(2-isopropyl-4-phenylindenyl)(2-methyl-4-phenylindenyl)hafnium dichloride, dimethylsilanediyl(2-isopropyl-4-(1-naphthyl)indenyl)(2-methyl-4-(1-naphthyl)indenyl)hafnium dichloride, dimethylsilanediyl(2-isopropyl-4-[4'-tert-butylphenyl]indenyl)(2-methyl-4-[4'-tert-butylphenyl]indenyl)hafnium dichloride, dimethylsilanediyl(2-isopropyl-4-[4'-tert-butylphenyl]indenyl)(2-ethyl-4-[4'-tert-butylphenyl]indenyl)hafnium dichloride, dimethylsilanediyl(2-isopropyl 4-[4'-tert-butylphenyl]indenyl)(2-methyl-4-[3',5'-bis-tert-butylphenyl]indenyl)hafnium dichloride, dimethylsilanediyl(2-isopropyl-4-[4'-tert-butylphenyl]indenyl)(2-methyl-4-[1'-naphthyl]indenyl)hafnium dichloride and ethylene(2-isopropyl-4-[4'-tert-butylphenyl]indenyl)(2-methyl-4-[4'-tert-butylphenyl]indenyl)hafnium dichloride, and also the corresponding dimethylhafnium, monochloromono(alkylaryloxy)hafnium and di(alkylaryloxy)hafnium compounds. The complexes can be used in the rac form, the meso form or as mixtures of these.

Among the hafnocenes of the general formula (VIII), those of the formula (IX)

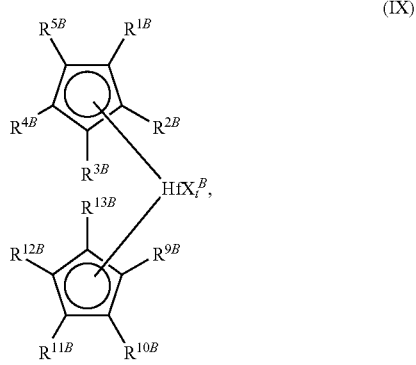

(IX)

are preferred.

Among the compounds of the formula (IX), preference is given to those in which $X^B$ is fluorine, chlorine, bromine, $C_1$-$C_4$-alkyl or benzyl, or two radicals $X^B$ form a substituted or unsubstituted butadiene ligand, t is 1 or 2, preferably 2, $R^{1B}$ to $R^{5B}$ are each hydrogen, $C_1$-$C_8$-alkyl, $C_6$-$C_8$-aryl, $NR^{8B}{}_2$, $OSiR^{8B}{}_3$ or $Si(R^{8B})_3$ and $R^{9B}$ to $R^{13B}$ are each hydrogen, $C_1$-$C_8$-alkyl or $C_6$-$C_8$-aryl, $NR^{14B}{}_2$, $OSiR^{14B}{}_3$ or $Si(R^{14B})_3$ or in each case two radicals $R^{1B}$ to $R^{5B}$ and/or $R^{9B}$ to $R^{13B}$ together with the $C_5$ ring form an indenyl, fluorenyl or substituted indenyl or fluorenyl system.

The hafnocenes of the formula (IX) in which the cyclopentadienyl radicals are identical are particularly useful.

Examples of particularly suitable hafnocenes (A2) of the formula (IX) are, inter alia: bis(cyclopentadienyl)hafnium dichloride, bis(indenyl)hafnium dichloride, bis(fluorenyl)hafnium dichloride, bis(tetrahydroindenyl)hafnium dichloride, bis(pentamethylcyclopentadienyl)hafnium dichloride, bis(trimethylsilylcyclopentadienyl)hafnium dichloride, bis(trimethoxysilylcyclopentadienyl)hafnium dichloride, bis(ethylcyclopentadienyl)hafnium dichloride, bis(isobutylcyclopentadienyl)hafnium dichloride, bis(3-butenylcyclopentadienyl)hafnium dichloride, bis(methylcyclopentadienyl)hafnium dichloride, bis(1,3-di-tert-butylcyclopentadienyl)hafnium dichloride, bis(trifluoromethylcyclopentadienyl)hafnium dichloride, bis(tert-butylcyclopentadienyl)hafnium dichloride, bis(n-butylcyclopentadienyl)hafnium dichloride, bis(phenylcyclopentadienyl)hafnium dichloride, bis(N,N-dimethylaminomethylcyclopentadienyl)hafnium dichloride, bis(1,3-dimethylcyclopentadienyl)hafnium dichloride, bis(1-n-butyl-3-methylcyclopentadienyl)hafnium dichloride, (cyclopentadienyl)(methylcyclopentadienyl)hafnium dichloride, (cyclopentadienyl)(n-butylcyclopentadienyl)hafnium dichloride, (methylcyclopentadienyl)(n-butylcyclopentadienyl)hafnium dichloride, (cyclopentadienyl)(1-methyl-3-n-butylcyclopentadienyl)hafnium dichloride, bis(tetramethylcyclopentadienyl)hafnium dichloride and also the corresponding dimethylhafnium compounds.

Further examples are the corresponding hafnocene compounds in which one or two of the chloride ligands have been replaced by bromide or iodide.

Also preference is given to the supported catalyst system as described above wherein the second transition metal coordination compound is an iron or cobalt coordination compound comprising a neutral tridentate ligand comprising three coordinating nitrogen atoms bearing at least one ortho-monosubstituted aryl radical (A3).

Special preference is given to iron or cobalt coordination compounds (A3) of formula (X)

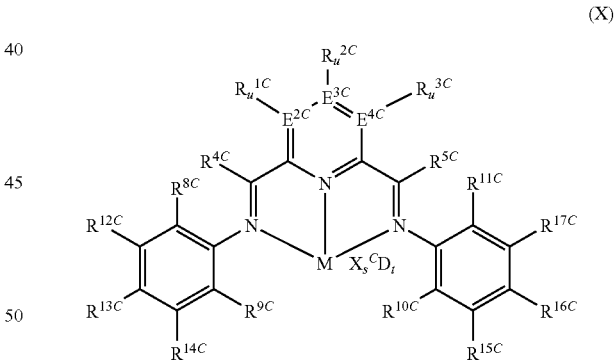

(X)

where

M is Fe or Co, in particular Fe $E^{2C}$-$E^{4C}$ are each, independently of one another, carbon, nitrogen or phosphorus, in particular carbon, $R^{1C}$-$R^{3C}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, halogen, $NR^{18C}{}_2$, $OR^{18C}$, $SiR^{19C}{}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}$-$R^{3C}$ are bound to form a five-, six- or seven-membered heterocycle containing at least one atom from the group consisting of N, P, O and S, $R^{4C}$-$R^{5C}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, $NR^{18C}_2$, $SiR^{19C}_3$, where the organic radicals $R^{4C}$-$R^{5C}$ may also be substituted by halogens, u is 0 when $E^{2C}$-$E^{4C}$ is nitrogen or phosphorus and is 1 when $E^{2C}$-$E^{4C}$ is carbon, $L^{1C}$-$L^{2C}$ are each, independently of one another, nitrogen or phosphorus, in particular nitrogen, $R^{8C}$-$R^{11C}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{8C}$-$R^{11C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S, with the provisio that at least one of the radicals $R^{8C}$-$R^{11C}$ is hydrogen.

$R^{12C}$-$R^{17C}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O or S, the indices v are each, independently of one another, 0 or 1, the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, arylalkyl having 1-10 carbon atoms in the alkyl part and 6-20 carbon atoms in the aryl part, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or a bulky noncoordinating anion and the radicals $X^C$ may be joined to one another, the radicals $R^{18C}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl part and 6-20 carbon atoms in the aryl part, $SiR^{19C}_3$, where the organic radicals $R^{18C}$ may also be substituted by halogens and nitrogen- and oxygen-containing groups and two radicals $R^{18C}$ may also be joined to form a five- or six-membered ring, the radicals $R^{19C}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{19C}$ may also be joined to form a five- or six-membered ring, s is 1, 2, 3 or 4, in particular 2 or 3, D is an uncharged donor and t is from 0 to 4, in particular 0, 1 or 2.

The embodiments and preferred embodiments described above likewise apply to $E^{2C}$-$E^{4C}$, $R^{1C}$-$R^{3C}$, $X^C$, $R^{18C}$ and $R^{19C}$.

The substituents $R^{4C}$-$R^{5C}$ can be varied within a wide range. Possible carboorganic substituents $R^{4C}$-$R^{5C}$ are, for example, the following: hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopeantyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-phenylethyl, where the organic radicals $R^{4C}$-$R^{5C}$ may also be substituted by halogens such as fluorine, chlorine or bromine. Furthermore, $R^{4C}$-$R^{5C}$ can be amino $NR^{18C}_2$ or $N(SiR^{19C}_3)_2$, for example dimethylamino, N-pyrrolidinyl or picolinyl. Possible radicals $R^{19C}$ in organosilicon substituents $SiR^{19C}_3$ are the same carboorganic radicals as described above for $R^{1C}R^{3C}$, where two radicals $R^{19C}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{19C}_3$ radicals can also be bound via nitrogen to the carbon bearing them.

Preferred radicals $R^{4C}$-$R^{5C}$ are hydrogen, methyl, ethyl, n-propyl, isopropyl, n-butyl, isobutyl, tert-butyl, n-pentyl, n-hexyl, n-heptyl, n-octyl or benzyl, in particular methyl.

The substituents $R^{8C}$-$R^{17C}$ can be varied within a wide range. Possible carboorganic substituents $R^{8C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-phenylethyl, where two radicals $R^{8C}$ to $R^{17C}$ may also be joined to form a 5-, 6- or 7-membered ring and/or two of the vicinal radicals $R^{8C}$-$R^{17C}$ may be joined to form a five-, six- or seven-membered heterocycle containing at least one atom from the group consisting of N, P, O and S and/or the organic radicals $R^{8C}$-$R^{17C}$ may also be substituted by halogens such as fluorine, chlorine or bromine. Furthermore, $R^{8C}$-$R^{17C}$ can be halogen such as fluorine, chlorine, bromine, amino $NR^{18C}_2$ or $N(SiR^{19C}_3)_2$, alkoxy or aryloxy $OR^{18C}$, for example dimethylamino, N-pyrrolidinyl, picolinyl, methoxy, ethoxy or isopropoxy. Possible radicals $R^{19C}$ in organosilicon substituents $SiR^{19C}_3$ are the same carboorganic radicals which have been mentioned above for $R^{1C}$-$R^{3C}$, where two radicals $R^{19C}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{19C}_3$ radicals can also be bound via an oxygen or nitrogen, for example trimethylsilyloxy, triethylsilyloxy, butyldimethylsilyloxy, tributylsilyloxy or tritert.butylsilyloxy.

Preferred radicals $R^{12C}$-$R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, $R^{13C}$ and $R^{16C}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{12C}$, $R^{14C}$, $R^{15C}$ and $R^{17C}$ are each hydrogen.

Preferred radicals $R^{8C}$-$R^{11C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine.

In particular, $R^{12C}$, $R^{14C}$, $R^{15C}$ and $R^{17C}$ are identical, $R^{13C}$ and $R^{16C}$ are identical, $R^{9C}$ and $R^{11C}$ are identical and $R^{8C}$ and $R^{10C}$ are identical. This is also preferred in the preferred embodiments described above.

The preparation of the transition metal coordination compounds of formula (X) is in principle the same as the preparation of the similar compounds of formula (II) or (IIa) as described above. Preferred complexes (A3) of formula (X) are 2,6-Bis[1-(2-methylphenylimino)ethyl]pyridine iron (II) dichloride, 2,6-Bis[1-(2,4-dimethylphenylimino)ethyl]pyridine iron (II) dichloride, 2,6-Bis[1-(2-chloro-phenylimino) ethyl]pyridine iron (II) dichloride, 2,6-Bis[1-(2-isopropylphenylimino)ethyl]pyridine iron (II) dichloride, 2,6-Bis[1-(2,4-diisopropyl phenylimino)methyl]pyridine iron (II) dichloride, 2,6-Bis[1-(2,4-dichloro-phenylimino)ethyl]pyridine iron (II) dichloride, 2,6-Bis[1-(2-methyl-4-chloro-phenylimino)ethyl]pyridine iron (II) dichloride, 2,6-Bis[1-(2-fluorophenylimino)ethyl]pyridine iron (II) dichloride, 2,6-Bis[1-(2-bromophenylimino)ethyl]pyridine iron (II) dichloride or the respective dibromides or tribromides.

The supported catalyst system of the present invention is active without the addition of the usual cocatalysts like aluminoxanes, strong uncharged Lewis acids or ionic compounds having a Lewis-acid cation or an ionic compound containing a Brönsted acid as cation. The addition of at least one of the known cocatalysts which are for example disclosed in WO 2005/058916 in some cases enhances the activity of the inventive catalyst systems.

The catalyst system may further comprise, as additional component (E), a metal compound of the general formula (XX),

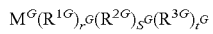

$$M^G(R^{1G})_{r^G}(R^{2G})_{s^G}(R^{3G})_{t^G}$$

where $M^G$ is Li, Na, K, Be, Mg, Ca, Sr, Ba, boron, aluminum, gallium, indium, thallium, zinc, in particular Li, Na, K, Mg, boron, aluminum or Zn, $R^{1G}$ is hydrogen, $C_1$-$C_{10}$-alkyl, $C_6$-$C_{15}$-aryl, arylalkyl or arylalkyl each having from 1 to 10 carbon atoms in the alkyl part and from 6 to 20 carbon atoms in the aryl part, $R^{2G}$ and $R^{3G}$ are each hydrogen, halogen, $C_1$-$C_{10}$-alkyl, $C_6$-$C_{15}$-aryl, alkylaryl, arylalkyl or alkoxy each having from 1 to 20 carbon atoms in the alkyl part and from 6 to 20 carbon atoms in the aryl part, or alkoxy together with $C_1$-$C_{10}$alkyl or $C_6$-$C_{15}$-aryl, $r^G$ is an integer from 1 to 3 and $s^G$ and $t^G$ are integers from 0 to 2, with the sum $r^G+s^G+t^G$ corresponding to the valence of $M^G$.

It is also possible to use mixtures of various metal compounds of the formula (XX).

Among the metal compounds of the general formula (XX), preference is given to those in which $M^G$ is lithium, magnesium, boron or aluminum and $R^{1G}$ is $C_1$-$C_{20}$-alkyl.

Particularly preferred metal compounds of the formula (XX) are methyllithium, ethyllithium, n butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n-heptylmagnesium, in particular n butyl-n-octylmagnesium, tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof. The partial hydrolysis products of aluminum alkyls with alcohols can also be used.

When a metal compound (E) is used, it is preferably present in the catalyst system in such an amount that the molar ratio of $M^G$ from formula (XX) to the sum of the transition metals from the transition metal coordination compounds is from 3000:1 to 0.1:1, preferably from 800:1 to 0.2:1 and particularly preferably from 100:1 to 1:1.

In general, the metal compound (E) of the general formula (XX) is used as constituent of a catalyst system for the polymerization or copolymerization of olefins. Here, the metal compound (E) can, for example, be added during or shortly before the polymerization. The metal compounds (E) used can be identical or different.

It is also possible for the catalyst system firstly to be prepolymerized with α-olefins, preferably linear $C_2$-$C_{10}$-1-alkenes and in particular ethylene or propylene, and the resulting prepolymerized catalyst solid then to be used in the actual polymerization. The mass ratio of catalyst solid used in the prepolymerization to a monomer polymerized onto it is usually in the range from 1:0.1 to 1:1000, preferably from 1:1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the catalyst system. The molar ratio of additives to the sum of transition metals from the transition metal coordination compounds is usually from 1:1000 to 1000:1, preferably from 1:5 to 20:1.

The catalyst system of the invention is suitable for the polymerization or copolymerization of olefins, preferably for the polymerization and copolymerization of ethylene with α-olefins preferably having from 3 to 12 carbon atoms.

The invention further provides a process for preparing ethylene homopolymers or copolymers, wherein ethylene is optionally copolymerized with $C_3$-$C_{12}$-1-alkenes in the presence of the inventive catalyst system.

In the copolymerization process of the invention, ethylene is preferably polymerized with α-olefins having from 3 to 12 carbon atoms. Preferred α-olefins are linear or branched $C_3$-$C_{12}$-1-alkenes, in particular linear $C_3$-$C_{10}$-1-alkenes such as propene, 1-butene, 1-pentene, 1-hexene, 1-heptene, 1-octene, 1-decene or branched $C_5$-$C_{10}$-1-alkenes such as 4-methyl-1-pentene. Particularly preferred α-olefins are $C_4$-$C_{12}$-1-alkenes, in particular linear $C_6$-$C_{10}$-1-alkenes. It is also possible to polymerize mixtures of various α-olefins. Preference is given to (co)polymerizing at least one α-olefin selected from the group consisting of ethene, propene, 1-butene, 1-pentene, 1-hexene, 1-heptene, 1-octene and 1-decene. Monomer mixtures containing at least 50 mol % of ethene are preferably used.

The process of the invention for polymerizing ethylene with or without α-olefins can be carried out using all industrially known polymerization methods at temperatures in the range from −60 to 350° C., preferably from 0 to 200° C. and particularly preferably from 25 to 150° C., and under pressures of from 0.5 to 4000 bar, preferably from 1 to 100 bar and particularly preferably from 3 to 40 bar. The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes and gas-phase fluidized-bed processes are all possible.

The polymerizations are usually carried out at temperatures in the range from 60 to 350° C., preferably in the range from 20 to 300° C., and under pressures of from 0.5 to 4000 bar. The mean residence times are usually from 0.5 to 5 hours, preferably from 0.5 to 3 hours. The advantageous pressure and temperature ranges for carrying out the polymerizations usually depend on the polymerization method. In the case of high-pressure polymerization processes, which are customarily carried out at pressures of from 1000 to 4000 bar, in particular from 2000 to 3500 bar, high polymerization temperatures are generally also set. Advantageous temperature ranges for these high-pressure polymerization processes are from 200 to 320° C., in particular from 220 to 290° C. In the case of low-pressure polymerization processes, it is usual to set a temperature which is at least a few degrees below the softening temperature of the polymer. In particular, temperatures of from 50 to 180° C., preferably from 70 to 120° C., are set in these polymerization processes. In the case of suspension polymerizations, the polymerization is usually carried out in a suspension medium, preferably an inert hydrocarbon such as isobutane or mixtures of hydrocarbons or else in the monomers themselves. The polymerization temperatures are generally in the range from −20 to 115° C., and the pressure is generally in the range from 1 to 100 bar. The solids content of the suspension is generally in the range from 10 to 80%. The polymerization can be carried out either batchwise, e.g. in stirring autoclaves, or continuously, e.g. in tube reactors, preferably in loop reactors. Particular preference is given to employing the Phillips PF process as described in U.S. Pat. No. 3,242,150 and U.S. Pat. No. 3,248,179. The gas-phase polymerization is generally carried out in the range from 30 to 125° C. at pressures of from 1 to 50 bar.

Among the abovementioned polymerization processes, particular preference is given to gas-phase polymerization, in particular in gas-phase fluidized-bed reactors, solution polymerization and suspension polymerization, in particular in loop reactors and stirred tank reactors. The gas-phase polymerization can also be carried out in the condensed or super-condensed mode, in which part of the circulating gas is cooled to below the dew point and is recirculated as a two-phase mixture to the reactor. Furthermore, it is possible to use a multizone reactor in which the two polymerization zones are linked to one another and the polymer is passed alternately through these two zones a number of times. The two zones can also have different polymerization conditions. Such a reactor is described, for example, in WO 97/04015. The different or identical polymerization processes can also, if desired, be connected in series so as to form a polymerization cascade, for example as in the Hostalen® process. A parallel reactor arrangement using two or more identical or different processes is also possible. Furthermore, molar mass regulators, for example hydrogen, or customary additives such as antistatics can also be used in the polymerizations. To obtain the high proportions of vinyl groups, the polymerization is preferably carried out with smaller amounts or no hydrogen present.

The polymerization is preferably carried out in a single reactor, in particular in a gas-phase reactor. The polymerization of ethylene with α-olefins having from 3 to 12 carbon atoms gives preferably a bi- or multimodale polyethylene when the catalyst of the invention is used. The polyethylene powder obtained directly from the reactor displays a very high homogeneity, so that, unlike the case of cascade processes, subsequent extrusion is not necessary in order to obtain a homogeneous product.

An important application of bimodal polyethylenes which are accessible by using the inventive catalyst system is their use for producing pressure pipes for the transport of gas, drinking water and wastewater. Pressure pipes made of polyethylene are increasingly replacing metal pipes. For this type of application, it is important that the pipe has a very long operating life without aging and brittle failure having to be feared. Even small flaws or notches in a pressure pipe can grow bigger even under low pressures and lead to brittle failure, with this process being able to be accelerated by increased temperatures and/or aggressive chemicals. It is therefore extremely important to reduce the number and size of the flaws in a pipe, for example specks or "white spots" as far as at all possible.

The following examples illustrate the invention without restricting the scope of the invention.

The measured values described were determined in the following way:

The vinyl group content was determined by means of IR in accordance with ASTM D 6248-98.

The methyl group content was determined by means of $^{13}$C-NMR spectroscopy as described by James. C. Randall, JMS-REV. Macromol. Chem. Phys., C29 (2&3), 201-317 (1989), and is based on the total content of $CH_3$ groups/1000 carbon atoms. The side chains larger than $CH_3$ and especially butyl side chain branches/1000 carbon atoms are likewise determined in this way The density [g/cm$^3$] was determined in accordance with ISO 1183.

The intrinsic viscosity was determined in accordance with EN ISO 1628-1.

The determination of the molar mass distributions and the means $M_n$, $M_w$, and $M_w/M_n$ derived therefrom was carried out by means of high-temperature gel permeation chromatography on a WATERS 150 C using a method based on DIN 55672 and the following columns connected in series: 3× SHODEX AT 806 MS, 1× SHODEX UT 807 and 1× SHODEX AT-G under the following conditions: solvent: 1,2,4-trichlorobenzene (stabilized with 0.025% by weight of 2,6-di-tert-butyl-4-methylphenol), flow: 1 ml/min, 500 μl injection volume, temperature: 135° C., calibration using PE Standards. Evaluation was carried out using WIN-GPC.

Abbreviations in the table below:

| Cat. | Catalyst |
|---|---|
| IV | Intrinsic viscosity |
| $M_w$ | Weight average molar mass |
| $M_w/M_n$ | Polydispersity |
| Prod. | Productivity of the catalyst in g of polymer obtained per g of catalyst used per hour |

$CH_3/1000C$ refers to total $CH_3/1000$ carbon atoms (including end groups)
$^{13}C$-NMR Hexene % Weight % of hexene measured by $^{13}C$-NMR
Polymer ex. means polymer from example Preparation of the Individual Components

EXAMPLE 1

Preparation of 2,6-Bis[1-(2-chloro-4,6-dimethylphenylimino)ethyl]pyridine-iron (II) chloride (Complex 1 or $(ClMe_2PhNCMe)_2Py*FeCl_2$)

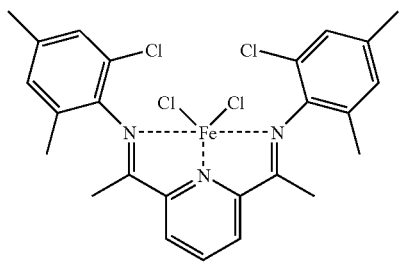

2,6-Bis[1-(2-chloro-4,6-dimethylphenylimino)ethyl]pyridine was produced analogue to example 2 of WO 98/27124 and converted to 2,6-bis[1-(2-chloro-4,6-dimethylphenylimino)ethyl]pyridine-iron (II) chloride by using with iron (II) chloride as described in example 8 of WO 98/27124.

EXAMPLE 2

Preparation of (2-methyl-3-(4-benzotrifluoride)-1-(8-quinolyl)cyclopentadienyl)chromium dichloride (Complex 2 or $Me(CF_3Ph)CpQ*CrCl_2$)

2.1. Preparation of 3-hydroxy-2-methyl-3-(4-benzotrifluoride)-1-(8-quinolyl)cyclopentene A solution of 3.51 g (15.6 mmol) of 4-bromobenzotrifluoride in 80 ml of tetrahydrofuran was cooled to −90° C. and 6.2 ml of n-butyllithium (2.5 M in hexane, 15.6 mmol) were subsequently added while stirring. After stirring at this temperature for 15 minutes, a solution of 2.9 g (13 mmol) of 2-methyl-3-(8-quinolyl)cyclopent-2-enone (see example 1.2) in 40 ml of tetrahydrofuran was added while stirring. The mixture was stirred at this temperature for another one hour and 1 ml of ethyl acetate was then added. The mixture was allowed to warm to room temperature while stirring and 100 ml of water were subsequently added. The aqueous phase was then separated off from the organic phase and the aqueous phase was extracted twice with diethyl ether. The organic phases were combined, dried over magnesium sulfate, filtered and the solvent was distilled off. The residue was dissolved in 5 ml of toluene and then admixed with 80 ml of hexane. The precipitate which formed was filtered off and dried. This gave 2.69 g (7.28 mmol) of 3-hydroxy-2-methyl-3-(4-benzotrifluoride)-1-(8-quinolyl)-cyclopentene. A second fraction was obtained after cooling of the mother liquor (1.42 g, 3.84 mmol, total yield: 85.4%).

$^1$H NMR (200, 13 MHZ, CDCl$_3$): 1.42 (3H, m, Me); 2.52 (2H, m, CH$_2$); 2.98 (1H, m, CH$_2$); 3.18 (1H, m, CH$_2$); 4.10 (1H, s, OH); 7.39 (1H, dd, H$_3$); 7.56-7.84 (7H, m, CH$_{quinolyl+aryl}$); 8.18 (1H, dd, H$_4$); 8.89 (1H, dd, H$_2$).

MS (EI), m/e (%): 369 (9) [M$^+$]; 351 (100) [M$^+$−H$_2$O]; 336 (12) [M$^+$-H$_2$O-Me]; 181 (72) [M$^+$-H$_2$O-Me-quinolyl-CH$_2$].

2.2. Preparation of 2-methyl-3-(4-benzotrifluoride)-1-(8-quinolyl)cyclopentadiene A mixture of 5 ml of water and 5 ml of concentrated hydrochloric acid was added to a solution of 3.61 g (9.8 mmol) of 3-hydroxy-2-methyl-3-(4-benzotrifluoride)-1-(8-quinolyl)cyclopentene in 100 ml of tetrahydrofuran. The mixture was stirred at room temperature for 90 minutes and ammonia solution was then added until the pH was 12. The aqueous phase was then separated off from the organic phase and the aqueous phase was extracted twice with diethyl ether. The organic phases were combined, dried over magnesium sulfate, filtered and the solvent was distilled off. The residue obtained in this way was distilled at 169-176° C. and 2×10$^2$ mbar to give 2.09 g (5.9 mmol, 60.2%) of 2-methyl-3-(4-benzotrifluoride)-1-(8-quinolyl)cyclopentadiene.

$^1$H NMR (200, 13 MHZ, CDCl$_3$): 1.13 (3H, d, Me); 1.97 (3H, m, Me); 2.03 (3H, m, Me); 3.62 (2H, m, CH$_2$); 3.87 (2H, m, CH$_2$); 4.81 (1H, q, CHMe); 6.59 (1H, m, CpH); 6.66 (1H, m, CpH); 7.07 (1H, m, CpH); 7.26 (1H, m, CpH); 7.31-7.88 (24H, m, CH$_{quinolyl+aryl}$); 8.14-8.24 (3H, m, H$_4$); 8.93-9.02 (3H, m, H$_2$).

MS (EI), m/e (%): 351 (100) [M$^+$]; 167 (72) [M$^+$-F$_3$CC$_6$H$_4$—C$_3$H$_3$].

2.3 Preparation of (2-methyl-3-(4-benzotrifluoride)-1-(8-quinolyl)-cyclopentadienyl)-chromium dichloride

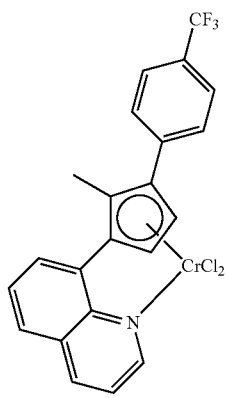

A solution of 2.09 g (5.95 mmol) of 2-methyl-3-(4-benzotrifluoride)-1-(8-quinolyl)-cyclopentadiene in 40 ml of tetrahydrofuran was added to a suspension of 0.242 g (5.95 mmol) of potassium hydride in 20 ml of tetrahydrofuran. After the addition was complete, the reaction mixture was stirred at room temperature for 6 hours and subsequently added to a solution of 2.23 g (5.95 mmol) of chromium trichloride tris-(tetrahydrofuran) in 50 ml of tetrahydrofuran while stirring. The mixture was stirred for a further 12 hours at room temperature, the solvent was then distilled off and the residue was washed 3 times with hexane and 3 times with toluene. The residue obtained in this way was extracted 3 times with methylene chloride and filtered off. The combined methylene chloride extracts were freed of the solvent, washed and dried under reduced pressure. This gave 1.58 g (3.34 mmol) of (2-methyl-3-(4-benzotrifluoride)-1-(8-quinolyl)-cyclopentadienyl)chromium dichloride (56.1%).

$^1$H NMR (200, 13 MHz, CDCl$_3$): −54.1 (1H, H$_4$); −17.1 (1H, H$_5$); 13.5 (3H, Me); 14.9 (1H, H$_6$); 48.8 (1H, H$_3$).

MS (EI), m/e (%): 472 (100) [M$^+$]; 437 (82) [M$^+$-Cl]; 400 (49) [M$^+$-2HCl]; 380 (22) [M*-2HCl—Cr—HF]; 348 (23) [M$^+$-2HCl—Cr].

EXAMPLE 3

Bis(n-butylcyclopentadienyl)hafnium dichloride is obtainable from Crompton (complex 3)

EXAMPLE 4

CpTiCl$_3$ (complex 4)

EXAMPLE 5

IndTiCl$_3$ (complex 5)

Preparation of Supported Catalysts:

Preparation of MgCl$_2$/AlR$_n$(OEt)$_{3-n}$-support

The support for catalysts A to E was prepared using MgCl$_2$*1.1 EtOH and AlEt$_3$ analog to the method described in EP 1 568 716 A1 to give the MgCl$_2$/AlR$_n$(OEt)$_{3-n}$-support with a composition of MgCl$_2$*0.20 AlEt$_{2.25}$OEt$_{0.75}$.

The support for catalysts F and G, MgCl$_2$*1.1 EtOH/TIBAL (Al/Mg=1.1/1), was obtained by adding 150 ml Toluol to 56.8 g MgCl$_2$*1.1 EtOH (Basell, S218-1) under argon. Furthermore, a 20 weight-% solution of 400 g Tri-isobutylaluminum in Toluene was added. The suspension was refluxed at 0° C. for 1 h. Then the temperature was raised to 80° C. and the mixture was refluxed for 2 h. After cooling the solid was filtrated and washed with heptane. 62 g support was obtained.

The support for catalysts H and I, MgCl$_2$*1.1EtOH/TIBAL (Al/Mg=2.1/1), was obtained by adding 150 ml Toluol to 40.6 g MgCl$_2$*1.1 EtOH (Basell, S218-1). Furthermore, a 2M solution of 290 ml triisobutylaluminum in toluene was added. The suspension was refluxed at 0° C. for 1 h, then the temperature was raised to 80° C. and the mixture was refluxed for another 2 h. After cooling the solid was filtrated and washed with heptane. 35 g support was obtained.

Catalyst A:

18 mg of complex 1 were dissolved in 20 ml of toluene. 2.43 ml (3.86 µmol) of that solution were added to 258.1 mg of the MgCl$_2$*0.20 AlEt$_{2.25}$OEt$_{0.75}$-support above (loading: 15 µmol/g). After stirring of the obtained suspension for two hours at 40° C. all of the solvent was removed in vacuum. The obtained powder had light red colour.

Catalyst B:

22 mg of complex 2 were dissolved in 25 ml of toluene. 3.3 ml (6.00 µmol complex 2) of this solution were added to 240.0 mg of the MgCl$_2$*0.20 AlEt$_{2.25}$OEt$_{0.75}$-support (loading: 25 µmol/g). After stirring of the obtained suspension for two hours at 40° C. the solvent was removed in vacuum. The obtained powder had green-blue colour.

Catalyst C:

4.3 ml (3.87 µmol) of a solution of 15.3 mg of complex 1 in 30 ml toluene and 3.7 ml (6.44 µmol) of a solution of 32.7 mg of complex 2 in 40 ml of toluene were added to 258 mg of the MgCl$_2$*0.20 AlEt$_{2.25}$OEt$_{0.75}$-support (loading: 15 µmol/g complex 1 and 25 µmol/g complex 2). After stirring of the obtained suspension for one hour at 40° C. the solvent was removed in vacuum. The obtained powder had green-blue colour.

Catalyst D:

5.1 ml (4.60 µmol) of a solution of 15.3 mg of complex 1 in 30 ml of toluene and 8.9 ml (15.29 µmol) of a solution of 32.7 mg of complex 2 in 40 ml of toluene were added to 306.1 mg of the MgCl$_2$*0.20 AlEt$_{2.25}$OEt$_{0.75}$-support (loading: 15 µmol/g complex 1 and 50 µmol/g complex 2). After stirring of the obtained suspension for one hour at 40° C. the solvent was removed in vacuum. The obtained powder had green-blue colour.

Catalyst E:

A solution of 32 mg of complex 1 in 42 ml of toluene and a solution of 34.1 mg of complex 2 in 30 ml of toluene were mixed and added to 779.2 mg of the MgCl$_2$*0.20 AlEt$_{2.25}$OEt$_{0.75}$-support (loading: 50 µmol/g complex 1 and 50 µmol/g complex 2). After stirring of the obtained suspension for one hour at 40° C. the solvent was removed in vacuum. The obtained powder had green-blue colour.

Catalyst F

A solution of 11 mg of complex 1 and 123 mg of complex 3 in 22 ml toluene and 5.7 ml MAO (30% solution, 4.75 mol/l) in toluene were mixed and added to 4.2 mg of the MgCl$_2$*1.1EtOH/TIBAL (Al/Mg=1.1/1)-support (loading: 5 µmol/g complex 1 and 60 µmol/g complex 3). After stirring of the obtained suspension for one hour at 40° C. the solvent was removed in vacuum. The obtained powder (5.5 g) had whitish colour.

Catalyst G

A solution of 22.25 mg of complex 1 and 92.5 mg of complex 4 in 25 ml toluene and 9.6 ml MAO (30% solution, 4.75 mol/l) in toluene were mixed and added to 5.7 mg of the MgCl$_2$*1.1EtOH/TIBAL (Al/Mg=1.1/1)-support(loading: 6.3 µmol/g complex 1 and 107 µmol/g complex 4). After stirring of the obtained suspension for one hour at 40° C. the solvent was removed in vacuum. The obtained powder had whitish colour.

Catalyst H

A solution of 42 mg of complex 1, 330 mg of complex 2 in 33 ml toluene and 1 ml MAO (30% solution, 4.75 mol/l) in toluene were mixed and added to 10.5 mg of the MgCl$_2$*1.1EtOH/TIBAL (Al/Mg=2.1/1)-support (loading: 7 µmol/g complex 1 and 60 µmol/g complex 2). After stirring of the obtained suspension for one hour at 40° C. the solvent was filtered, in vacuum. The obtained powder (10 g) had a whitish colour.

Catalyst I

A solution of 7.3 mg of complex 1 and 32 mg of complex 2 and 15 mg of complex 5 and 0.2 ml MAO (30% solution, 4.75 mol/l) in toluene were mixed and added to 2 g of the MgCl$_2$*1.1EtOH/TIBAL (Al/Mg=2.1/1)-support (loading: 6.5 µmol/g complex 1 and 30 µmol/g complex 2 and 30 µmol/g complex 5). After stirring of the obtained suspension for one hour at 40° C. the solvent was removed by filtration. The obtained powder (2.1 g) had whitish colour.

Polymerizations in a 1l Autoclave:

A 1-l-steel autoclave was filled under argon at 70° C. with 150 g of PE-powder (which was already dried at 80° C. for 6 hours in vacuum and stored under argon atmosphere) having a particle size of >1 mm. 200 mg isoprenylaluminum IPRA (IPRA in heptane 50 mg/ml) as well as 5 mg of Costelan AS 100 (Costelan in heptane 5 mg/ml) were added. In case of copolymerization the corresponding amount of hexane was added. After 5 minutes of stirring catalyst was added and the catalyst dosing unit was rinsed with 7 ml of heptane. First the argon pressure was increased up to 10 bar at 70° C. then a pressure of 20 bar was adjusted with ethylene. The pressure of 20 bar was kept constant for 1 hour via adding additional ethylene during the polymerization. After one hour the pressure was released and the autoclave was cooled down to room temperature. The polymer was dried in vacuum, removed from the autoclave and sieved in order to remove the polymer bed.

| Polymerization run | Cat. | Cat. [mg] | hexene [ml] | polymer ex [g] | Prod. [g/g] | IV [dl/g] | $^{13}$C-NMR: total $CH_3$ [1/1000C] | IR: total $CH_3$ [1/1000C] | $^{13}$C-NMR: Hexene [%] |
|---|---|---|---|---|---|---|---|---|---|
| 1 | A | 138 | — | 6 | 43 | <0.7 | n.m. | | n.m. |
| 2 | A + B$^{a)}$ | 71 + 71 | 7 | 3 | 21 | 1.25 | 4.3 | | 0.8 |
| 3 | C | 144 | 7 | 12 | 83 | 1.18 | 2.9 | | 1.5 |
| 4 | D | 165 | 7 | 3.5 | 21 | 1.05 | 7.1 | | 1.3 |
| 5 | E$^{b)}$ | 113 | — | 60 | 531 | 2.89 | 2.4 | | — |
| 6 | E | 86 | 6 | 21 | 244 | 1.5 | 4.4 | | 0.8 |
| 7 | E$^{c)}$ | 102 | 7 | 35 | 343 | 1.39 | | 3.5 | 0.8 |
| 8 | F | 128.9 | 5 | 42 | 325 | 2.43 | | 7.9 | 3.9 |
| 9 | G$^{d)}$ | 186 | 7 | 44 | 236 | 8.13 | | 1 | 0.8 |
| 10 | H | 111 | — | 56 | 500 | 2.12 | | 1.5 | — |
| 11 | I | 150 | — | 31 | 207 | 3.58 | | 0.9 | — |

$^{a)}$A catalyst blend of A and B was used.
$^{b)}$GPC data: $M_w$ = 264 kg/mol, $M_w/M_n$ = 22.
$^{c)}$A total of 130 ml of hydrogen was continiously introduced to the autoclave
$^{d)}$A total of 113 ml of Hydrogen was continiously introduced to the autoclave

The invention claimed is:

1. A supported catalyst system comprising the product obtained by contacting:

a) an adduct of the formula $$MgT_2 * yAlR^q_j(OR^u)_{3-j}$$

wherein

T is chlorine, bromine, or iodine;

$R^u$ is a linear or branched $C_1$-$C_{10}$ alkyl radical, y ranges from 6 to 0.05;

j ranges from 3 to 0.1; and $R^q$ are the same or different $C_1$-$C_{20}$ hydrocarbon radical substituents, each optionally containing silicon or germanium; and b) at least two different transition metal coordination compounds, (A) and (B), wherein transition metal compound (B) comprises iron or cobalt and a neutral tridentate ligand comprising three coordinating nitrogen atoms.

2. The catalyst system of claim 1 wherein the neutral tridentate ligand is a 2,6-bisimino pyridine.

3. The catalyst system of claim 1 wherein the neutral tridentate ligand bears at least two ortho, ortho-disubstituted aryl radicals.

4. The catalyst system of claim 1 wherein transition metal compound (A) is a monocyclopentadienyl Group 4-6 metal complex whose cyclopentadienyl system is substituted by an uncharged donor or a hafnocene.

5. The catalyst system of claim 1 wherein transition metal compound (A) comprises iron or cobalt and a neutral tridentate ligand comprising three coordinating nitrogen atoms bearing at least one ortho-monosubstituted aryl radical.

6. The catalyst system of claim 1 further comprising a cocatalyst selected from the group consisting of aluminoxanes, strong uncharged Lewis acids, ionic compounds having a Lewis-acid cation, and ionic compounds containing a Brönsted acid cation.

7. The catalyst system of claim 1 wherein T is chlorine; $R^u$ is a linear $C_1$-$C_{10}$ alkyl radical; y ranges from 2 to 0.1; and $R^q$ is a linear or branched, cyclic or acyclic, $C_1$-$C_{20}$ alkyl, $C_2$-$C_{20}$ alkenyl, $C_2$-$C_{20}$ alkynyl, $C_6$-$C_{20}$ aryl, $C_7$-$C_{20}$ alkylaryl or $C_7$-$C_{20}$ arylalkyl radical optionally containing silicon or germanium.

8. A prepolymerized catalyst of claim 1 comprising the supported catalyst system and a linear $C_2$-$C_{10}$ 1-alkene polymer, wherein the mass ratio of the polymer to supported catalyst system ranges from 1:0.1 to 1:1000.

9. A process for preparing ethylene homopolymers or copolymers, wherein ethylene is polymerized, optionally in the presence of a $C_3$-$C_{12}$ 1-alkene, in the presence of the catalyst system of claim 1.

* * * * *